(12) United States Patent
Christoffersson et al.

(10) Patent No.: US 12,543,213 B2
(45) Date of Patent: Feb. 3, 2026

(54) DETERMINATION OF PRACH OCCASIONS AND PUSCH OCCASIONS FOR 2-STEP RANDOM ACCESS

(71) Applicant: Telefonaktiebolaget LM Ericsson (publ), Stockholm (SE)

(72) Inventors: Jan Christoffersson, Luleå (SE); Min Wang, Luleå (SE); Stephen Grant, Pleasanton, CA (US); Robert Mark Harrison, Grapevine, TX (US); Zhipeng Lin, Nanjing (CN); Johan Rune, Lidingö (SE); Johan Axnäs, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 620 days.

(21) Appl. No.: 17/765,497

(22) PCT Filed: Oct. 2, 2020

(86) PCT No.: PCT/EP2020/077747
§ 371 (c)(1),
(2) Date: Mar. 31, 2022

(87) PCT Pub. No.: WO2021/064223
PCT Pub. Date: Apr. 8, 2021

(65) Prior Publication Data
US 2022/0408478 A1 Dec. 22, 2022

Related U.S. Application Data

(60) Provisional application No. 62/910,294, filed on Oct. 3, 2019.

(51) Int. Cl.
*H04W 74/00* (2009.01)
*H04W 74/0833* (2024.01)
(Continued)

(52) U.S. Cl.
CPC ..... *H04W 74/002* (2013.01); *H04W 74/0833* (2013.01); *H04W 74/0836* (2024.01); *H04W 74/0838* (2024.01)

(58) Field of Classification Search
CPC ........... H04W 74/002; H04W 74/0833; H04W 74/0836
See application file for complete search history.

(56) References Cited

U.S. PATENT DOCUMENTS 10,349,449 B2 7/2019 Hong et al.
10,383,149 B2 8/2019 Uchino et al.
(Continued)

FOREIGN PATENT DOCUMENTS

CN 101499889 A 8/2009
CO 2021010432 A2 9/2021
(Continued)

OTHER PUBLICATIONS

3rd Generation Partnership Project, "Technical Specification Group Radio Access Network; Study on NR-based access to unlicensed spectrum (Release 16)", 3GPP TR 38.889 V16.0.0, Dec. 2018, pp. 1-163.
(Continued)

*Primary Examiner* — Kent Krueger
(74) *Attorney, Agent, or Firm* — COATS & BENNETT, PLLC

(57) ABSTRACT

Operation in unlicensed spectrum requires Clear Channel Assessment (CCA), where a transmitter must monitor the channel before transmitting, to ensure it is free. An exception is a brief gap that allows for Rx/Tx turn-around, so that an ACK can be transmitted following reception, without performing a new CCA. NR introduces a 2-step Random Access (RA) procedure, where MsgA includes both a PRACH and a PUSCH transmission. To minimize CCA
(Continued)

delays in unlicensed spectrum, only those RACH opportunities (ROs) and PUSCH opportunities (POs) that result in a very small delay between the PRACH and PUSCH transmissions of MsgA should be employed. RO configurations are defined for LTE 4-step RA. Embodiments provides methods for selecting which of these be may be shared for 2-step RA, for selecting which should be used in case of collisions, for selecting ROs and POs when the configurations are not shared, and for communicating RO configurations to UEs.

18 Claims, 19 Drawing Sheets

(51) Int. Cl.
    *H04W 74/0836* (2024.01)
    *H04W 74/0838* (2024.01)

(56) References Cited

U.S. PATENT DOCUMENTS

| | | |
|---|---|---|
| 10,542,506 B2 | 1/2020 | Liu et al. |
| 11,419,143 B2* | 8/2022 | Abedini ............... H04W 74/02 |
| 2018/0077736 A1 | 3/2018 | Pelletier et al. |
| 2019/0132882 A1 | 5/2019 | Li et al. |
| 2020/0100297 A1* | 3/2020 | Agiwal ............... H04W 52/365 |
| 2020/0351948 A1 | 11/2020 | Lei et al. |
| 2022/0015156 A1 | 1/2022 | Xu |
| 2022/0061104 A1 | 2/2022 | Sun et al. |
| 2022/0279593 A1* | 9/2022 | Zheng ............... H04W 74/0838 |
| 2022/0353919 A1* | 11/2022 | Liu ..................... H04W 74/002 |

FOREIGN PATENT DOCUMENTS

| | | |
|---|---|---|
| CO | 2021010739 A2 | 9/2021 |
| EP | 3911104 A1 | 11/2021 |
| WO | 2018064367 A1 | 4/2018 |
| WO | 2020168285 A1 | 8/2020 |

OTHER PUBLICATIONS

Samsung, "Channel Structure for Two-Step RACH", 3GPP TSG RAN WG1 #97, May 13-17, 2019, pp. 1-11, Reno, US, R1-1906905.
Ericsson, "Procedure for Two-step RACH", 3GPP TSG-RAN WG1 Meeting #97, May 13-17, 2019, pp. 1-8, Reno, US, R1-1907181.
3rd Generation Partnership Project, "3rd Generation Partnership Project; Technical Specification Group Radio Access Network; NR; Medium Access Control (MAC) Protocol Specification (Release 15)", Technical Specification, 3GPP TS 38.321 V15.7.0, Sep. 2019, pp. 1-78, 3GPP, France.

* cited by examiner

Example:
SSBs = 8
M = 32 (i.e. 2 SSBs per PRACH occ.)
PRACH FDM = 2
PRACH format A3 (2 TD occs./slot)
PRACH config. Period = 20 ms
2 PRACH slots per config. period

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | *Last PRACH occasion in a slot* |
| 12 | Reserved |
| 13 | Reserved |
| 14 | Reserved |
| 15 | Reserved |

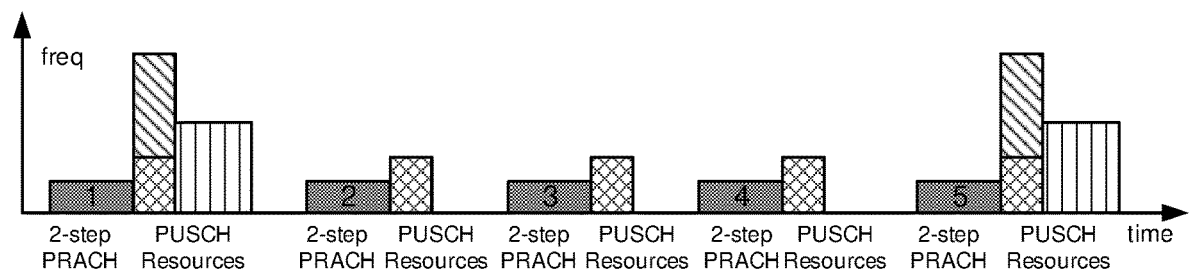
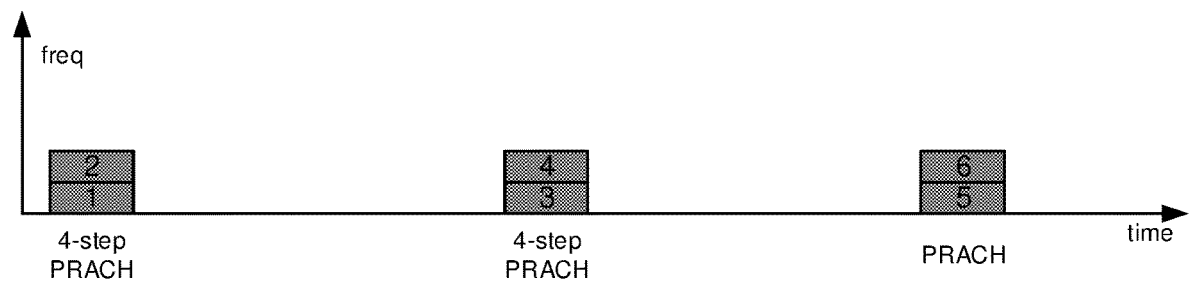
Figure 11
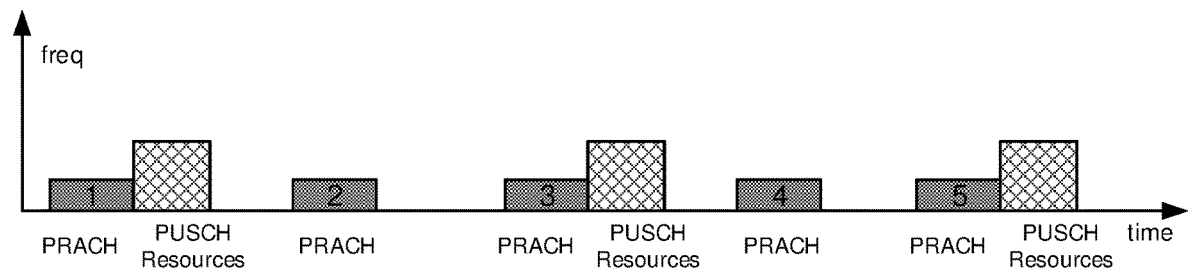
Figure 12

100

RECEIVE SIGNALLING INDICATING A PLURALITY OF PRE-CONFIGURED RO WHICH ARE CANDIDATES FOR SPECIFIC PRACH TRANSMISSIONS OF A 2-STEP OR PRIORITIZED RA PROCEDURE
102

TRANSMIT TO THE NETWORK AN RA PREAMBLE IN ONE OF THE PLURALITY OF PRE-CONFIGURED ROs
104

SEND, TO ONE OR MORE WIRELESS DEVICES, SIGNALLING INDICATING A PLURALITY OF PRE-CONFIGURED ROs WHICH ARE CANDIDATES FOR SPECIFIC PRACH TRANSMISSIONS OF A 2-STEP OR PRIORITIZED RA PROCEDURE
202

RECEIVE, FROM A WIRELESS DEVICE, AN RA PREAMBLE IN ONE OF THE PLURALITY OF PRE-CONFIGURED ROs
204

Figure 16

DETERMINATION OF PRACH OCCASIONS AND PUSCH OCCASIONS FOR 2-STEP RANDOM ACCESS

RELATED APPLICATIONS

This application claims priority to U.S. Application No. 62/910,294 filed 3 Oct. 2019, disclosure of which is incorporated in its entirety by reference herein.

TECHNICAL FIELD

The present invention relates generally to wireless communication, and in particular to systems and methods for determining PRACH and PUSCH occasions for a 2-step Random Access procedure.

BACKGROUND

Wireless communication networks, including network nodes and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

5G is not yet fully defined, but in an advanced draft stage within the Third Generation Partnership Project (3GPP). 5G wireless access will be realized by the evolution of Long Term Evolution (LTE) for existing spectrum, in combination with new radio access technologies that primarily target new spectrum. Thus, it includes work on a 5G New Radio (NR) Access Technology, also known as next generation (NX). The NR air interface targets spectrum in the range from below 1 GHz up to 100 GHz, with initial deployments expected in frequency bands not utilized by LTE. Some LTE terminology may be used in this disclosure in a forward looking sense, to include equivalent 5G entities or functionalities, although a different term is or may eventually be specified in 5G.

In addition to expanded bandwidth and higher bitrates to enrich User Equipment (UE) experience, the 5G NR technology will include expanded support for machine-to-machine (M2M) or machine type communications (MTC), variously known as the Networked Society or Internet of Things (IoT). Accordingly, use of the term "UE" herein is synonymous with "wireless device," and specifically includes wireless devices that have no "user." Although some M2M communications are anticipated to be intermittent, delay-tolerant, and low bandwidth, such as utility meter reading and similar status-reporting type applications, other anticipated applications will require very low latency—indeed, near-real-time—such as autonomous vehicle control. Reduced latency is also a requirement for many modes of service to conventional UE such as smartphones, such as high resolution video conferencing, interactive gaming, and the like. Accordingly, reducing latency in all aspects of wireless communication network operation stands as one major challenge in 5G systems and beyond.

Additionally, in NR, both license assisted access (LAA) and standalone operation in unlicensed spectrum (NR-U) are to be supported in 3GPP. Hence the procedure of PRACH transmission and/or scheduling request (SR) transmission in unlicensed spectrum shall be investigated in 3GPP. With network operation in unlicensed spectrum follows a number of restrictions. One of them is that a device (e.g. a radio network node or a mobile terminal) must monitor the shared medium, i.e. the channel, and determine that it is free (not being used by any other device) before starting to transmit on the channel. This procedure is referred to as Listen-Before-Talk (LBT) or Clear Channel Assessment (CCA). In this mechanism, a radio device performs energy detection (ED) on the channel over a time period. The channel is determined to be idle—meaning transmission can proceed—if the detected energy is less than an energy detection threshold (ED threshold). In this case, the device may only transmit on the channel up to a predetermined time duration, referred to as the maximum channel occupancy time (MCOT). If the channel is determined to be occupied (detected energy>ED threshold), the transmitter performs a random back-off within a contention window before again attempting to access the channel. One exception to the need to perform LBT/CCA prior to accessing the network is that a device may transmit an ACK/NACK if it is within a predetermined "gap" timing following a received transmission.

When first accessing the network, a UE performs a Random Access (RA) procedure. In LTE, this is a 4-step procedure, as indicated by FIG. 1. Briefly, the UE receives synchronization signals and system information periodically broadcast by the network. The UE then transmits a Random Access preamble on the Physical Random Access Channel (PRACH), referred to as message 1 (msg1). The network transmits a Random Access Response (RAR) message, or msg2, which includes timing and uplink resource information (as indicated, this could be from multiple base stations that received the msg1). The UE then sends a Connection Request message, msg3, on the Physical Uplink Shared Channel (PUSCH) to a specific base station, using the uplink (UL) grand in msg2. The network then sends a Contention Resolution Message, msg4, to the UE to resolve possible contention between UEs performing RA. The times in which the UE can initiate RA are predetermined, and referred to as RACH Opportunities (RO).

To reduce latency, NR introduces a 2-step RA, as indicated by FIG. 8. In this procedure, a UE receives broadcast synchronization and system information, as in the 4-step RA. The UE then sends both a RA preamble on PRACH and higher layer data, such as a Connection Request, on PUSCH, both referred to as message A. The network responds with a RAR, called message B, which includes UE identifier, timing advance, contention resolution, and the like. In this procedure (unlike 4-step RA), the UE does not receive an UL grant prior to its PUSCH transmission in msgA. NR has the flexibility to either configure separate ROs for 2-step and 4-step RA, or to share at least some ROs between the two, using different preambles.

One advantage of the 2-step RA procedure is that it requires only two LBTs, as compared to four LBTs required for 4-step RA—but only if the "gap" between the PRACH and PUSCH parts of msgA is less than the LBT gap, which may for example be 16 usec.

The 2-step RA can reduce latency due to fewer messages being exchanged between a base station and UE during the RA procedure. Additionally, in unlicensed spectrum, this means fewer LBTs may be required, depending on the PRACH-to-PUCH gap. Accordingly, selection of a subset of ROs for 2-step RA from those configured for 4-step RA, or alternatively the separate configuration of ROs for 2-step RA, which minimize the msgA gap, stands as a challenge for low latency operation in unlicensed spectrum.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

Embodiments disclosed and claimed herein indicate which ROs are shared and not between the 2-step and 4-step RA procedure when the configuration is shared. The embodiments may also be applied to indicate which RO should be used in the case that configurations are not shared, e.g., to indicate that only the last RO in a slot should be used. The embodiments include using a PRACH mask or indicating in broadcast signalling that only a subset of ROs should be used. The ROs selected minimize the PRACH/PUSCH gap in MsgA of a 2-step RA, which may significantly reduce latency when operating in unlicensed spectrum, where LBT must be observed.

One embodiment relates to a method, performed by a wireless device operative in a wireless communication network, of performing a Random Access (RA) procedure. Signalling indicating a plurality of pre-configured Random Access Channel (RACH) occasions (RO), which are candidates for specific Physical Random Access Channel (PRACH) transmissions of a 2-step or prioritized RA procedure, is received from the network. An RA preamble is transmitted to the network in one of the plurality of pre-configured ROs.

Another embodiment relates to a wireless device operative in a wireless communication network. The wireless device includes communication circuitry configured to wirelessly communicate with one or more nodes of the wireless communication network, and processing circuitry operatively connected to the communication circuitry. The processing circuitry is configured to cause the wireless device to receive signalling indicating a plurality of pre-configured Random Access (RA) Channel (RACH) occasions (RO) which are candidates for specific Physical Random Access Channel (PRACH) transmissions of a 2-step or prioritized RA procedure; and transmit to the network an RA preamble in one of the plurality of pre-configured ROs.

Yet another embodiment relates to a method, performed by a base station operative in a wireless communication network, of participating in a Random Access (RA) procedure. Signalling indicating a plurality of pre-configured Random Access Channel (RACH) occasions (RO) which are candidates for specific Physical Random Access Channel (PRACH) transmissions of a 2-step or prioritized RA procedure, is sent to one or more wireless devices. An RA preamble is received from a wireless device in one of the plurality of pre-configured ROs.

Still another embodiment relates to a base station operative in a wireless communication network. The base station includes communication circuitry configured to wirelessly communicate with one or more wireless devices, and processing circuitry operatively connected to the communication circuitry. The processing circuitry is configured to cause the base station to send, to one or more wireless devices, signalling indicating a plurality of pre-configured Random Access Channel (RACH) occasions (RO) which are candidates for specific Physical Random Access Channel (PRACH) transmissions; and receive, from a wireless device, an RA preamble in one of the plurality of pre-configured ROs.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 11 depicts two time/frequency graphs illustrating PRACH configurations for 2-step and 4-step RA, respectively.

FIG. 12 is a time/frequency graph illustrating a shared PRACH configuration between 2-step and 4-step RA.

FIG. 15 is a flow diagram of a method of performing a RA procedure by a wireless device.

FIG. 16 is a flow diagram of a method of participating in a RA procedure by a base station.

DETAILED DESCRIPTION

Figure 1:
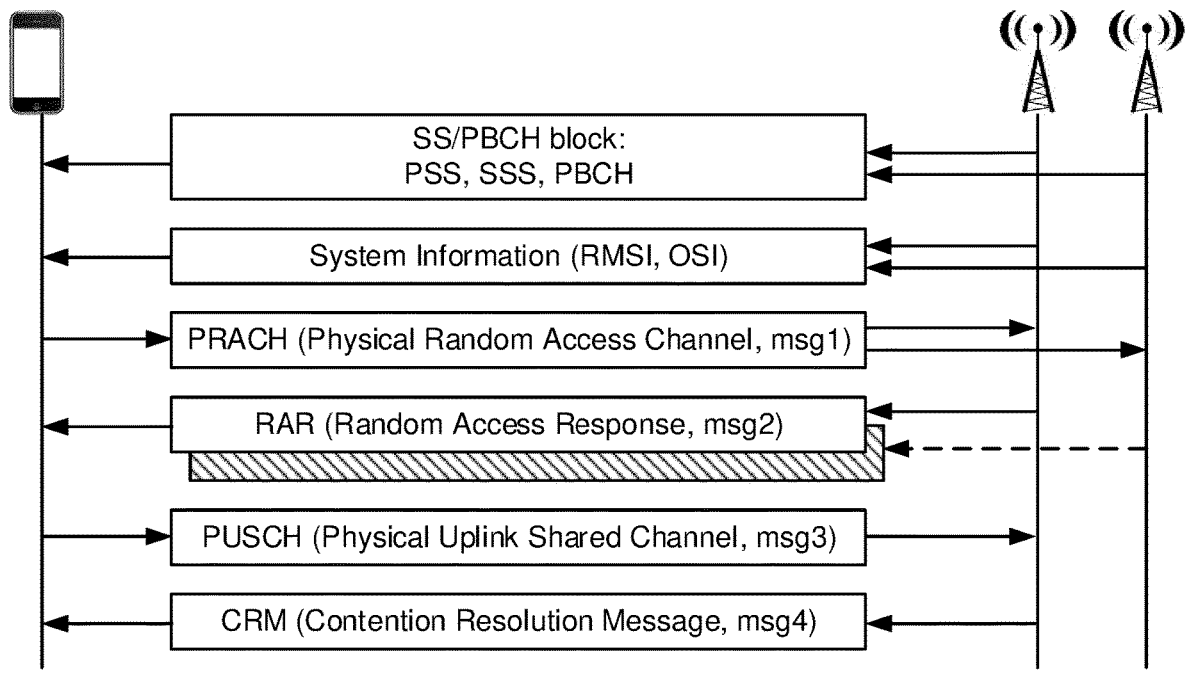
FIG. 1 is a signaling diagram of 4-step Random Access (RA) procedure.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

NR-U Introduction

In order to tackle the ever-increasing data demand, NR is considered for both licensed and unlicensed spectrum. The standardization work for licensed spectrum in Rel-15 was finalized, and the study item on NR-based Access to Unlicensed Spectrum was finalized in 2018. The corresponding work item was approved at RP-82 in December 2018, and compared to LTE LAA, NR-U also needs to support dual connectivity (DC) and standalone scenarios, where the MAC procedures including RACH and scheduling procedure on unlicensed spectrum are subject to LBT and thus potential LBT failures. In LTE LAA, there are no such issues since the RACH and scheduling related signaling can be transmitted on the PCell in licensed spectrum instead of unlicensed spectrum.

For discovery reference signal (DRS) transmission such as PSS/SSS, PBCH, CSI-RS, control channel transmission such as PUCCH/PDCCH, physical data channel such as PUSCH/PDSCH, and uplink sounding reference signal such as SRS transmission, channel sensing should be applied to determine the channel availability before the physical signal is transmitted using the channel.

The RRM procedures in NR-U would be generally rather similar to those in LAA, since NR-U is aiming to reuse LAA/eLAA/feLAA technologies as much as possible to handle the coexistence between NR-U and other legacy RATs. RRM measurements and report comprising special configuration procedure with respect to the channel sensing and channel availability.

Hence, channel access/selection for LAA was one of the important aspects for co-existence with other RATs such as Wi-Fi. For instance, LAA has aimed to use carriers that are congested with Wi-Fi.

Channel Access Procedure in NR-U

Listen-before-talk (LBT) is designed for unlicensed spectrum co-existence with other RATs. In this mechanism, a radio device applies a clear channel assessment (CCA) check (i.e. channel sensing) before any transmission. The transmitter involves energy detection (ED) over a time period compared to a certain energy detection threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time, or MCOT). For QoS differentiation, a channel access priority based on the service type has been defined. For example, four LBT priority classes are defined for differentiation of channel access priorities between services using different contention window sizes (CWS) and MCOT durations.

As described in 3GPP TR 38.889, "Study on NR-based access to unlicensed spectrum, Release 16", v 16.0.0, the disclosure of which is incorporated herein by reference in its entirety, the channel access schemes for NR-based access for unlicensed spectrum can be classified into the following categories:

Cat-1: Immediate Transmission after a Short Switching Gap

This is used for a transmitter to immediately transmit after a UL/DL switching gap inside a COT.

The switching gap from reception to transmission is to accommodate the transceiver turnaround time and is no longer than 16 μs.

Cat-2: LBT without Random Back-Off

The duration of time that the channel is sensed to be idle before the transmitting entity transmits is deterministic.

Cat-3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Cat-4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

COT Sharing in NR-U

For a node (e.g., NR-U gNB/UE, LTE-LAA eNB/UE, or Wi-Fi AP/STA) to be allowed to transmit in unlicensed spectrum (e.g., 5 GHz band) it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing, where the latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small time duration (called SIFS) is introduced between the data transmission and the corresponding feedback which does not include actual sensing of the channel. In 802.11, the SIFS period (16 μs for 5 GHz OFDM PHYs) is defined as:

$$aSIFSTime = aRxPHYDelay + aMACProcessingDelay + aRxTxTurnaroundTime$$

aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 us.

4 Step Random Access Procedure in NR

A 4-step approach is used for the random access procedure, see FIG. 1. In this approach, the UE detects a synchronization signal (SS) and decodes the broadcasted system information, followed by transmitting a PRACH preamble (message 1) in the uplink. The gNB replies with a RAR (Random Access Response, message 2). The UE then transmits a UE identification (message 3) on PUSCH. The UE transmits PUSCH (message 3) after receiving a timing advance command in the RAR, allowing PUSCH to be received with a timing accuracy within the cyclic prefix. Without this timing advance, a very large CP would be needed in order to be able to demodulate and detect PUSCH, unless the system is applied in a cell with very small distance between UE and gNB. Since NR will also support larger cells with a need for providing a timing advance to the UE the 4-step approach is needed for random access procedure.

1.1.1.1 NR Rel-15 PRACH Configuration

In NR, the time and frequency resource on which a PRACH preamble is transmitted is defined as a PRACH occasion.

The time resources and preamble format for PRACH transmission is configured by a PRACH configuration index, which indicates a row in a PRACH configuration table specified in TS 38.211 Tables 6.3.3.2-2, 6.3.3.2-3, 6.3.3.2-4 for FR1 paired spectrum, FR1 unpaired spectrum and FR2 with unpaired spectrum, respectively.

Part of the Table 6.3.3.2-3 for FR1 unpaired spectrum for PRACH preamble format 0 is copied in Table 1 below, where the value of x indicates the PRACH configuration period in number of system frames. The value of y indicates the system frame within each PRACH configuration period on which the PRACH occasions are configured. For instance, if y is set to 0, then, it means PRACH occasions only configured in the first frame of each PRACH configuration period. The values in the column "subframe number" tells which subframes are configured with PRACH occasion. The values in the column "starting symbol" is the symbol index. Determination of time resources for PRACH transmission for FR2 using table 6.3.3.2-4 is similar, except that 60 kHz slots are used instead of subframes.

In case of TDD, semi-statically configured DL parts and/or actually transmitted SSBs can override and invalidate some time-domain PRACH occasions defined in the PRACH configuration table. More specifically, PRACH occasions in the UL part are always valid, and a PRACH occasion within the X part is valid as long as it does not precede or collide with an SSB in the PRACH slot and it is at least N symbols after the DL part and the last symbol of an SSB. N is 0 or 2 depending on PRACH format and subcarrier spacing.

TABLE 1

PRACH configuration for preamble format 0 for FR1 unpaired spectrum

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |

TABLE 1-continued

PRACH configuration for preamble format 0 for FR1 unpaired spectrum

| PRACH Configuration Index | Preamble format | $n_{SFN}$ mod x = y | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|---|
| | | x | y | | | | | |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. Random access preambles can only be transmitted in the frequency resources given by the higher-layer parameter msg1-FrequencyStart. The PRACH frequency resources $n_{RA} \in \{0, 1, \ldots, M-1\}$, where M equals the higher-layer parameter msg1-FDM, are numbered in increasing order within the initial active uplink bandwidth part during initial access, starting from the lowest frequency. Otherwise, $n_{RA}$ are numbered in increasing order within the active uplink bandwidth part, starting from the lowest frequency. The number M of PRACH occasions FDMed in one time domain PRACH occasion, can be 1, 2, 4, or 8.

Here the msg1-FDM and msg1-FrequencyStart are defined in 3GPP TS 38.331 as below:

msg1-FDM

The number of PRACH transmission occasions FDMed in one time instance. (see TS 38.211 [16], clause 6.3.3.2)

msg1-FrequencyStart

Offset of lowest PRACH transmission occasion in frequency domain with respective to PRB 0. The value is configured so that the corresponding RACH resource is entirely within the bandwidth of the UL BWP. (see TS 38.211 [16], clause 6.3.3.2).

| RACH-ConfigGeneric information element |
|---|
| -- ASN1START |
| -- TAG-RACH-CONFIG-GENERIC-START |
| RACH-ConfigGeneric ::=        SEQUENCE { |
|     prach-ConfigurationIndex      INTEGER (0..255), |
|     msg1-FDM                      ENUMERATED {one, two, four, eight}, |
|     msg1-FrequencyStart           INTEGER (0..maxNrofPhysicalResourceBlocks-1), |
|     zeroCorrelationZoneConfig     INTEGER(0..15), |
|     preambleReceivedTargetPower   INTEGER (-202..-60), |
|     preambleTransMax                  ENUMERATED {n3, n4, n5, n6, n7, n8, n10, n20, n50, n100 n200}, |
|     powerRampingStep              ENUMERATED {dB0, dB2, dB4, dB6}, |
|     ra-ResponseWindow             ENUMERATED {sl1, sl2, sl4, sl8, sl1, sl20, sl40, sl80}, |
|     ... |
| } |
| -- TAG-RACH-CONFIG-GENERIC-STOP |
| -- ASN1STOP |

Figure 2:
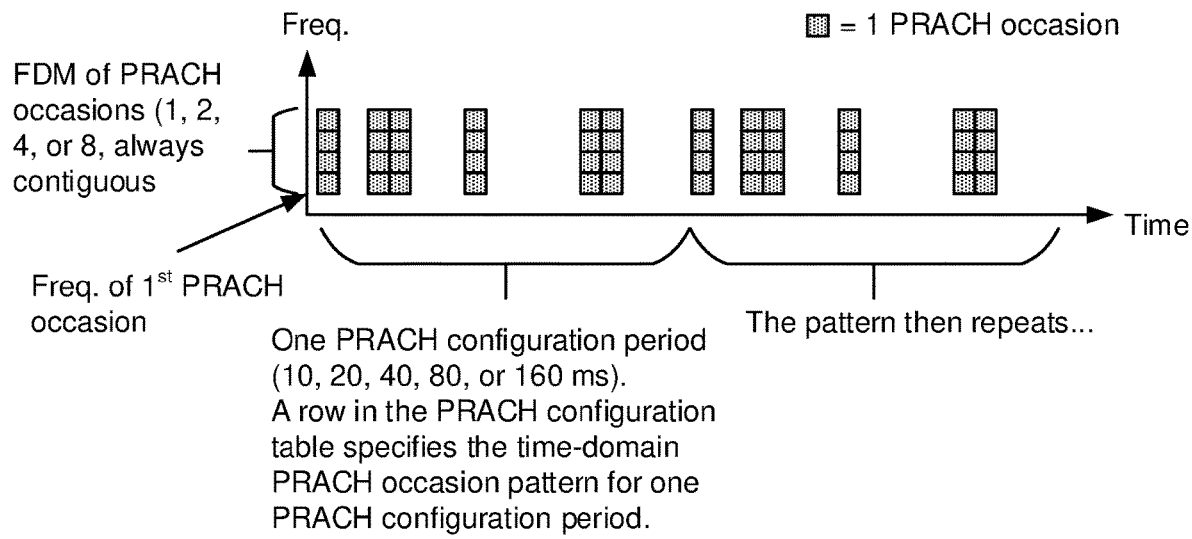
FIG. 2 is a time/frequency graph depicting PRACH configuration in NR.

FIG. 2 show an example of the PRACH occasion configuration in NR.

In NR Rel-15, there are up to 64 sequences that can be used as random-access preambles per PRACH occasion in each cell. The RRC parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

For CFRA, a PRACH mask can be used to indicate which ROs that can be used for preamble transmission to indicate a specific SSB. This is signaled by ra-ssb-OccasionMaskIndex in either BeamFailureRecoveryConfig for beam failure recovery or in RACH-ConfigDedicated. The signalled value (PRACH Mask Index) is used in Table 7.4-1 in 38.321 to determine which ROs that can be used.

TABLE 7.4-1

| PRACH Mask Index values | |
| --- | --- |
| PRACH Mask Index | Allowed PRACH occasion(s) of SSB |
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |

RACH-ConfigDedicated information element

```
-- ASN1START
-- TAG-RACH-CONFIG-DEDICATED-START
RACH-ConfigDedicated ::=          SEQUENCE {
    cfra                                          CFRA
OPTIONAL, -- Need S
    ra-Prioritization                             RA-Prioritization
OPTIONAL, -- Need N
    ...
}
CFRA ::=                          SEQUENCE {
    occasions                         SEQUENCE {
        rach-ConfigGeneric                RACH-ConfigGeneric,
        ssb-perRACH-Occasion              ENUMERATED {oneEighth, oneFourth, oneHalf, one, two, four,
eight, sixteen}    OPTIONAL     -- Cond SSB-CFRA
    }                                             OPTIONAL,
-- Need S
    resources                         CHOICE {
        ssb                               SEQUENCE {
            ssb-ResourceList                  SEQUENCE (SIZE(1..maxRA-SSB-Resources)) OF CFRA-SSB-
Resource,
            ra-ssb-OccasionMaskIndex          INTEGER (0..15)
        },
        csirs                             SEQUENCE {
            csirs-ResourceList                SEQUENCE (SIZE(1..maxRA-CSIRS-Resources)) OF CFRA-
CSIRS-Resource,
            rsrp-ThresholdCSI-RS              RSRP-Range
        }
    },
    ...,
    [[
    totalNumberOfRA-Preambles-v1530 INTEGER (1..63)         OPTIONAL    -- Cond
Occasions
    ]]
}
CFRA-SSB-Resource ::=             SEQUENCE {
    ssb                               SSB-Index,
    ra-PreambleIndex                  INTEGER (0..63),
    ...
}
CFRA-CSIRS-Resource ::=           SEQUENCE {
    csi-RS                            CSI-RS-Index,
    ra-OccasionList                   SEQUENCE (SIZE(1..maxRA-OccasionsPerCSIRS)) OF INTEGER (0..maxRA-
Occasions-1),
    ra-PreambleIndex                  INTEGER (0..63),
    ...
}
- TAG-RACH-CONFIG-DEDICATED-STOP
- ASN1STOP
```

TABLE 7.4-1-continued

PRACH Mask Index values

| PRACH Mask Index | Allowed PRACH occasion(s) of SSB |
|---|---|
| 14 | Reserved |
| 15 | Reserved |

NR Rel-15 Association Between SSB and PRACH Occasion

Figure 3:
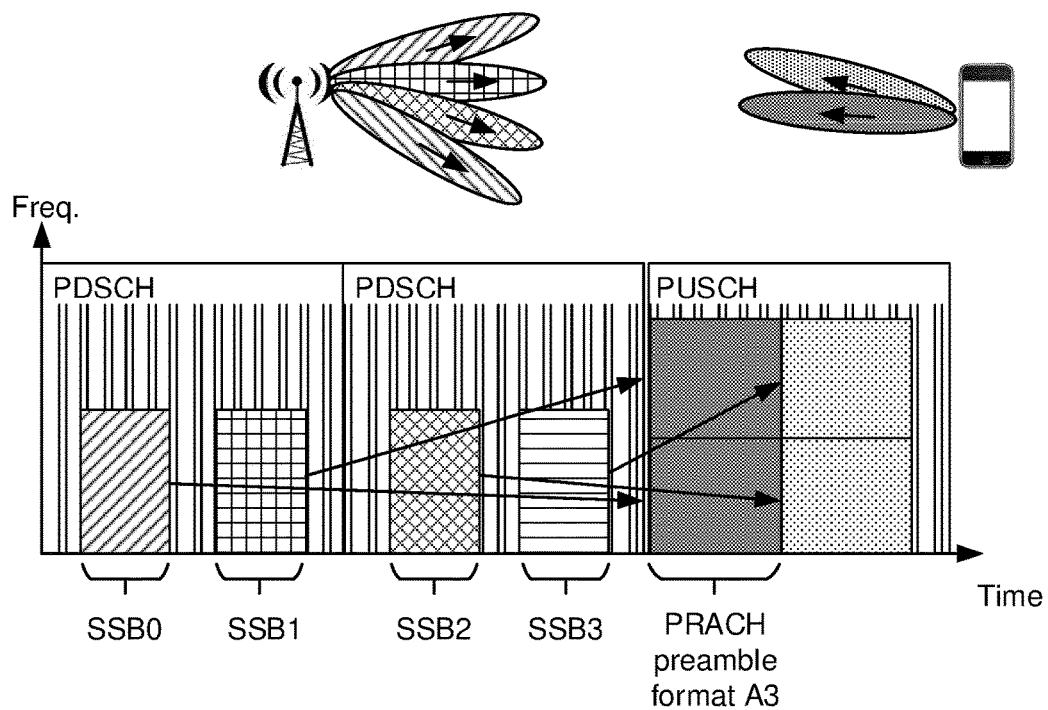
FIG. 3 is a time/frequency graph depicting one-to-one mapping of SSBs to PRACH occasions.
Figure 4:
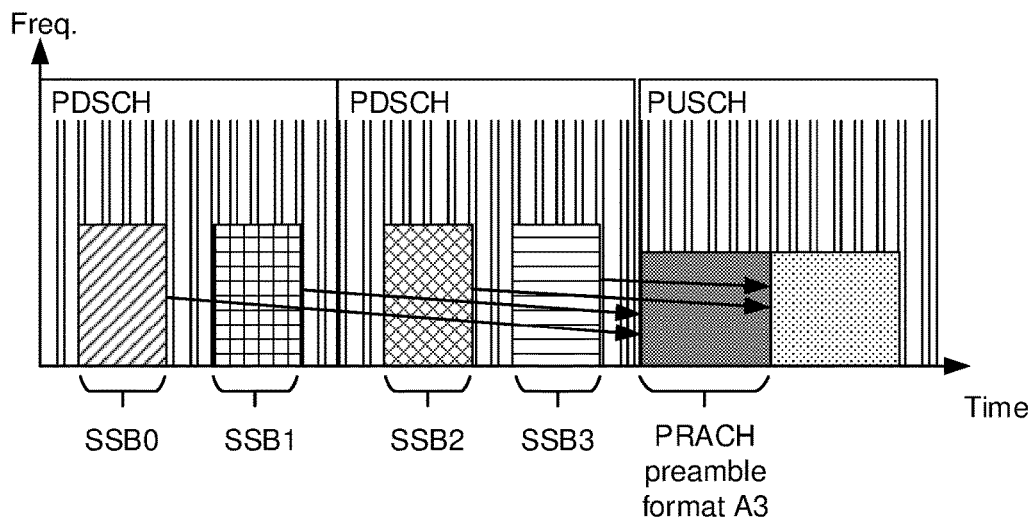
FIG. 4 is a time/frequency graph depicting many-to-one mapping of SSBs to PRACH occasions.

NR Rel-15 supports one-to-one, one-to-many, and many-to-one association between SSB and PRACH Occasions. For example, FIG. 3 shows an example of one SSB per PRACH occasion. Similarly, FIG. 4 shows an example of two SSBs per PRACH occasion.

The preambles associated to each SSB is configured by the two RRC parameters in the RACH-ConfigCommon: ssb-perRACH-OccasionAndCB-PreamblesPerSSB and totalNumberOfRA-Preambles.

The detailed mapping rule is specified in TS 38.213 section 8.1, as follows:

A UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by totalNumberOfRA-Preambles and is an integer multiple of N.

SS/PBCH block indexes provided by ssb-PositionsInBurst in SIB1 or in ServingCellConfigCommon are mapped to valid PRACH occasions in the following order where the parameters are described in [4, TS 38.211].

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots An association period, starting from frame 0, for mapping SS/PBCH blocks to PRACH occasions is the smallest value in the set determined by the PRACH configuration period according Table 8.1-1 such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

Figure 5:
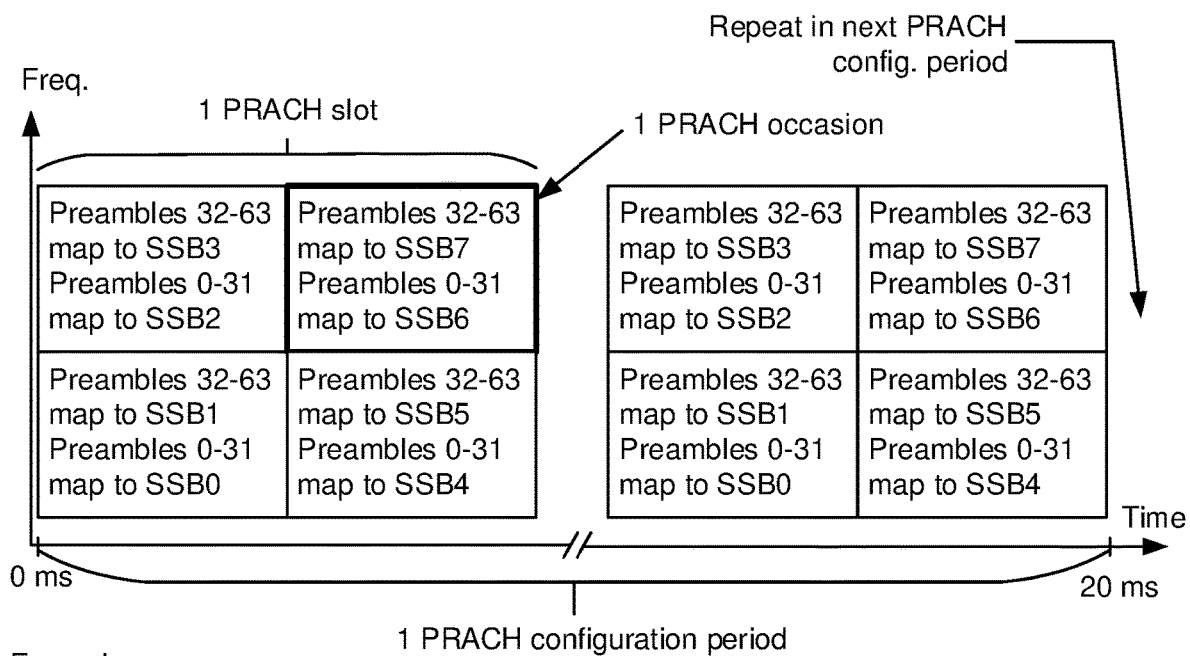
FIG. 5 is a time/frequency graph illustrating a mapping between SSB and RACH preambles.

In other words, the mapping between SSB and RA preambles is done by consecutively associating M preambles to each SSB, where $M=N_{preamble}^{total}/N$, and as illustrated in FIG. 5 the preambles are taken in the following order:

First, in increasing order of preamble indexes within a single PRACH occasion.

Second, in increasing order of frequency resource indexes for frequency multiplexed PRACH occasions.

Third, in increasing order of time

Figure 6:
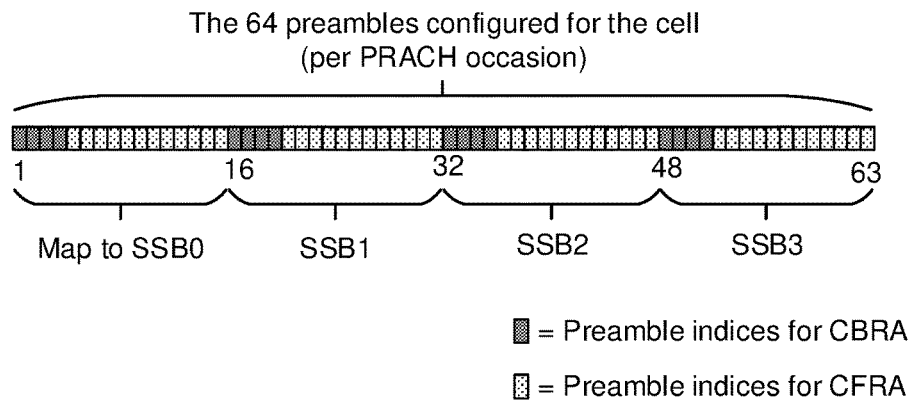
FIG. 6 is a block diagram of RA preambles associated to CBRA and CFRA per SSB per PRACH occasion.

For each SSB, the associated preambles per PRACH occasion are further divided into two sets for Contention Based RACH (CBRA) and Contention Free RACH (CFRA). The number of CB preambles per SSB per PRACH occasion is signalled by the RRC parameter CB-preambles-per-SSB (derived from ssb-perRACH-OccasionAndCB-PreamblesPerSSB). Preamble indices for CBRA and CFRA are mapped consecutively for one SSB in one PRACH occasion, as shown in FIG. 6.

Figure 7:
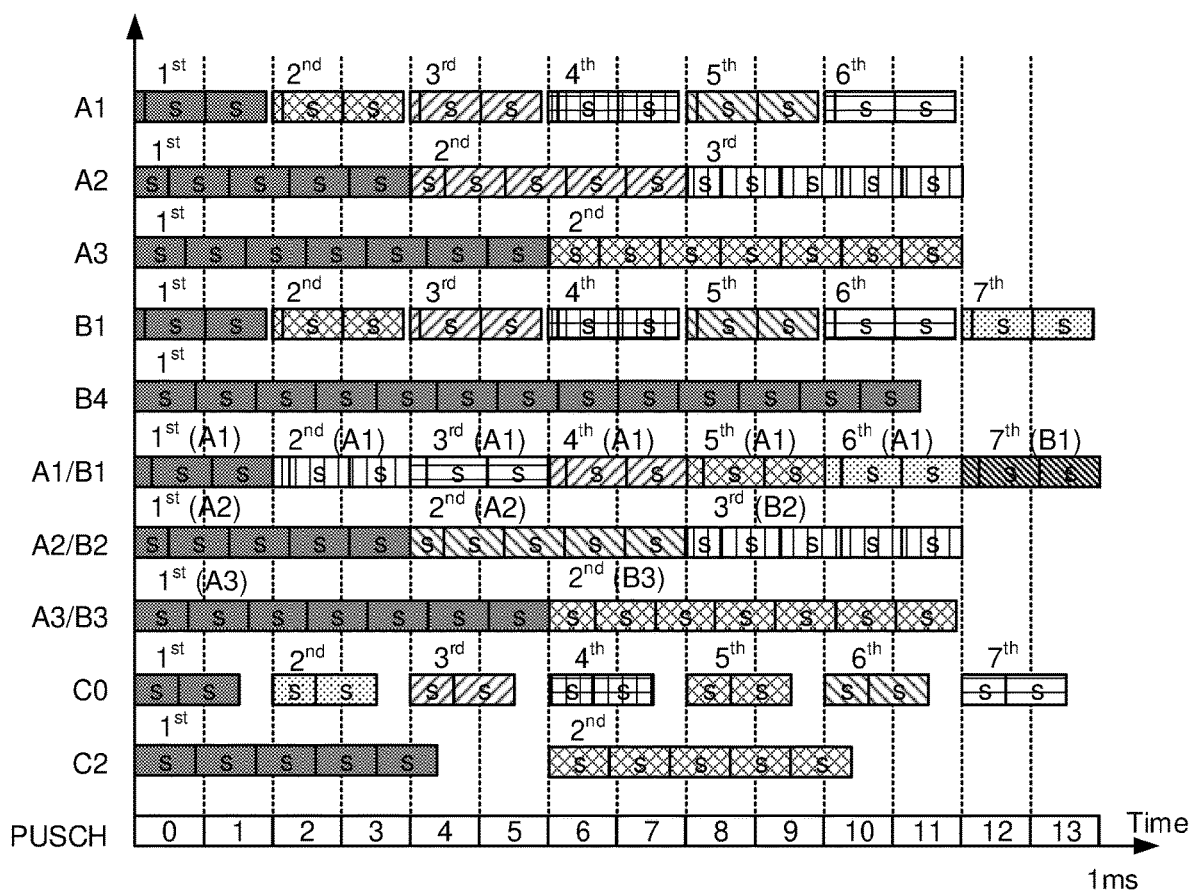
FIG. 7 is a block diagram depicting an example of RA preamble format allocation in a slot.

The preamble format used for the 4-step RA procedure is configured in system information (SI) together with the PRACH occasions which are given by the prach-ConfigurationIndex. An example of how the preamble formats can be allocated in Rel-15 in a slot (with a subcarrier spacing of 15 kHz) is shown in FIG. 7.

As can be seen, there can be RO in the beginning, middle or end of a slot, depending on preamble format. Also, there may be configurations where there is no possibility to have the ROs in the end of a slot.

2-Step RACH Work Item for NR Release 16

A 2-step RACH work item has been approved in RAN1 #82 plenary meeting. See 3GPP TR 38.889 "Study on NR-based access to unlicensed spectrum, Release 16", v 16.0.0, the disclosure of which is incorporated herein by reference, in its entirety.

Figure 8:
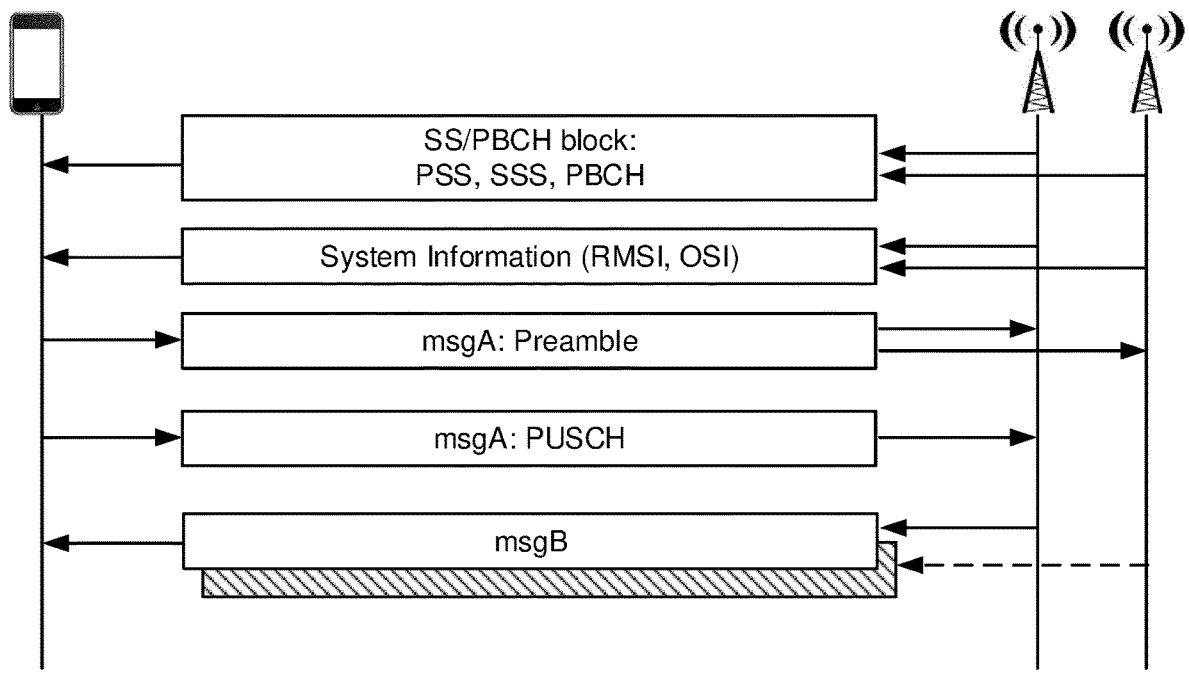
FIG. 8 is a signaling diagram of 2-step RA procedure.

Completing the initial access in only two steps as illustrated in FIG. 8:

Step 1: UE sends a message A including random access preamble together with higher layer data such as RRC connection request possibly with some small payload on PUSCH;

Step 2: The gNB sends RAR (actually called message B) including UE identifier assignment, timing advance information, and contention resolution message etc.

As can be seen, there will be no explicit grant from msgB for PUSCH in msgA as the msgB is after MsgA.

PRACH and PUSCH Occasions (POs) for 2-Step RA

For NR-U, the 2-step procedure has the advantage that it may only need 2 LBTs compared to the 4 LBTs needed to complete the 4-step RA procedure. However, this relies on there being no gap larger than 16 μs between the preamble and PUSCH transmissions of msgA.

For 2-step RA work item in NR release 16, the latest discussion from the 3GPP RAN1 #96b meeting regarding how to define the ROs (RACH occasions) and the PUSCH occasions (POs) for 2-step RA include the following.

For the relation of PRACH resources between 2-step and 4-step RACH, the network has the flexibility to configure the following options:

Option 1: Separate ROs are configured for 2-step and 4-step RACH

Option 2: Shared RO but separate preambles for 2-step and 4-step RACH

It can be seen from the above that in one option of PRACH configuration, preambles to be used for 2-step and 4-step RACH operation are in separate ROs and therefore separate OFDM symbols and/or separate sets of subcarriers, while in another option preambles to be used for 2-step and 4-step RACH operation can be in one RO and therefore in the same set of OFDM symbols and subcarriers.

One or more PUSCH occasion(s) within an msgA PUSCH configuration period are configured.

FFS msgA PUSCH configuration period, e.g.

For opt. 1 with separate PUSCH configuration, msgA PUSCH configuration period may or may not be the same as PRACH configuration period For opt. 2 PUSCH configuration with relative location, msgA PUSCH configuration period is the PRACH configuration period It can be seen from the above that PUSCH occasions carrying msgA data part occur in resources that are preconfigured in 2-step RA, which is in contrast to msg3 transmission, which occurs in resources that are scheduled by the RAR in 4-step RA.

In RAN1 #98 it was determined how to configure the msgA PUSCH time resources, where at least 2 preamble groups will be used to indicate 2 groups of msgA PUSCH configurations.

For RRC_INACTIVE/IDLE state, at least support up to two msgA PUSCH configurations for Rel. 16

Using different preamble groups for the indications of different configurations in case of two configurations Support of more than two configurations is not precluded, and if supported FFS the following mechanisms for the indications of different configurations Alt. 1: Using different preamble groups Alt 2: Using different preamble groups and/or RO partitioning Alt. 3: Using UCI based indication Alt. 4: Using different DMRS ports/sequences At least up to two msgA PUSCH configurations are supported for RRC_CONNECTED state for Rel. 16

FFS details

FFS whether the MsgA PUSCH configurations are the same among different RRC states (IDLE, INACTIVE, CONNECTED)

FFS the rule or BS signaling the criterion for the UE's selection of msgA PUSCH configuration The following considerations concern whether a subset of ROs need to or can be shared by 2-step RA and 4-step RA, to see whether any modification of PRACH configuration tables are needed for 2-step RA and to introduce some invalidation rules when the 2-step RO and 4-step RO collide in case the 2-step ROs are separately configured respectively.

For shared ROs with 4-step RACH and 2-step RACH configured with separate preambles:

All 4-step RACH ROs can be shared with 2-step RACH.

FFS: Whether only a subset of 4-step RACH ROs can be shared with 2-step RACH

FFS: How to indicate the shared ROs.

2-step RACH at least reuses the 4-step RACH configuration tables (Table 6.3.3.2-2/3/4 of TS 38.211).

FFS: Whether in case of 4-step RACH and 2-step RACH with separately configured ROs, additional PRACH configurations for 2-step RACH are needed.

In case of 4-step RACH and 2-step RACH with separately configured ROs, the network can configure a separate prach-ConfigurationIndex for 2-step RACH If the prach-ConfigurationIndex for 2-step RACH is not configured, 2-step RACH reuses the corresponding 4-step RACH parameter.

FFS: Whether the preamble formats of 2-step RACH and 4-step RACH are the same or different.

The rules for a UE for invalidating 2-step RACH ROs follow the same rules that are used for the invalidation of 4-step RACH ROs as described in section 8.1 of TS 38.213.

FFS: For separately configured 2-step RACH and 4-step RACH ROs, if 2-step RACH ROs overlap with 4-step RACH ROs in time and frequency, Option 1: the 2-step RACH ROs become invalid.

Option 2: This is not expected by UE.

Other options are not precluded.

In NR-U, a UE doing a 2-step RA may transmit MsgA after one successful LBT if there is less than 16 μs gap between the preamble and PUSCH part of MsgA. If the gap is greater than 16 μs but less than 25 μs, a short LBT operation (25 μs CAT2 LBT) is required between the PRACH and PUSCH parts of MsgA, but this is still preferable to a long (full exponential backoff (CAT4)) LBT operation that would be required if the gap is greater than 25 μs. A problem which may occur in some PRACH configurations is that the preamble transmission is in the beginning of the slot and the PUSCH transmission is in the following slot. In this case, the transmission gap may be larger than 16 μs, forcing the UE to do a LBT operation, therefore facing the risk of losing access to the channel since the channel may be grasped by another device operating in the unlicensed band. In this case the latency of the 2-step RA procedure is increased, since the UE will do a fallback to the 4-step procedure.

The PRACH occasions (ROs) defined in NR Rel-15 are mainly close to each other in one PRACH slot and some of the formats have some gap in the end of the slot, so if the msgA PUSCH time frequency resource allocated/reserved is within the PRACH slot, it would be mainly in the end of the PRACH slot, thus only a last RO(s) of the slot is preferred to be used for transmission of the preamble, to minimize the gap between msgA preamble and msgA PUSCH.

In some cases, the ROs are shared between 2-step and 4-step. In this case, the preambles would be different for 2-step and 4-step. One reason for not wanting to share all ROs could be that the PUSCH resource configuration would not have the same periodicity so that some ROs would not have a PUSCH resource immediately following the RO. In the RAN1 meeting RAN1 #98, it was left FFS if only a subset of the RO can be shared and how this could be indicated.

In some cases, separately configured 2-step and 4-step ROs may partially overlap. In this case an invalidation rule must be defined for those overlapped ROs. And even in case 2-step RO configuration is not overlapped with any 4-step RO, if some PRACH formats used by 4-step RA are also considered for 2-step RA, some additional rules may be needed to select only a subset of the 2-step ROs to minimize the gap between msgA preamble and msgA PUSCH.

According to embodiments of the present invention, methods indicate which ROs are shared, and which are not shared, between the 2-step and 4-step RA procedures when the configuration is shared. The methods may also be applied to indicate which RO should be used in the case that configurations are not shared, e.g., to indicate that only the last RO in a slot should be used. The methods includes using a PRACH mask, or indicating in broadcast signaling, that only a subset of ROs should be used.

In one embodiment, in which a 2-step RACH occasion is in a subset of Rel-15 RACH occasions, where at least one RO is at the end of the RACH slot, and which precedes periodic PUSCH occasions, a method of a UE transmitting within a subset of RA resources includes:

Receiving signaling identifying a plurality of consecutive random access occasions, wherein the UE may transmit a random access preamble in the consecutive random access occasions;

Receiving signaling identifying a set of periodically recurring symbols in which a physical uplink shared channel (PUSCH) may be transmitted, the PUSCH comprising symbols containing resource elements carrying UL-SCH or a demodulation reference signal associated with the PUSCH;

Receiving additional signaling identifying a subset of random access resources, the subset being comprised in at least one RACH occasion of the consecutive random access occasions that is immediately followed by a first symbol of the PUSCH;

Selecting a random access preamble in the subset of random access resources;

Transmitting the selected random access preamble;

Transmitting the PUSCH in the set of symbols.

In another embodiment, in which the UE additionally uses earlier RACH occasions for 4-step than for 2-step, wherein 4-step UE receives a single-shot grant to transmit PUSCH, the method further includes:

selecting a different random access occasion not in the subset of random access occasions;

Transmitting a different random access preamble in the different random access occasion;

Receiving signaling identifying a single instance of resources in which to transmit the PUSCH Transmitting the PUSCH in the single instance of resources In another embodiment, in which 4-step ROs are invalidated by 2-step ROs, either above method further includes:

the plurality of consecutive RACH occasions is identified by a first configuration signaled to the UE, the subset of random access resources comprises one or more RACH occasions wherein the UE may only transmit a random access preamble associated with the PUSCH In another embodiment, in which 2-step uses only the last RO and that is adjacent to PUSCH, in any of the above methods the subset of random access resources is comprised in exactly one RACH occasion of the consecutive random access occasions.

In another embodiment, in which the ROs and POs are within a slot, in any of the above methods the consecutive random access occasions and the PUSCH together are contained within a slot and have a same subcarrier spacing, where the slot is comprised of a number of OFDM symbols that does not vary with the subcarrier spacing for a given cyclic prefix length.

The methods described in this disclosure are applicable to both unlicensed and licensed spectrum. NR-U is one example of unlicensed spectrum scenario. They are also applicable to other unlicensed operation scenarios such as LTE LAA/eLAA/feLAA/MulteFire.

As described above, the UE may receive signaling from the network indicating a subset of pre-configured RACH occasions that are candidates for specific PRACH transmissions. The signaling may be by various means. For example, the indication may be received by broadcast signaling (e.g., SIB1); by dedicated signaling (e.g., dedicated RRC signaling); or carried by a MAC CE or a DCI. The signaling may contains a binary flag indicating that either the candidate subset includes only the last RACH occasion in the slot, or that it includes all RACH occasions of the candidate subset. The signaling may include an integer N≥1 which indicates that the candidate subset consists of the last N RACH occasions in the slot. The signaling may includes a bitmask (PRACH mask) that indicates which pre-configured PRACH occasions are candidates for specific PRACH transmissions. In one embodiment, all SS/PBCH blocks are mapped to all RACH occasions in the indicated subset.

The specific PRACH transmissions may relate to various RA types or events. For example, it may be an RA with 2-step procedure. The RA may be a prioritized RA, such as an RA triggered for events such as handover; BFR; or services with a higher priority level (i.e., the priority level may be determined according to the service priority, such as QCI or 5QI). The RA may be triggered upon arrival of a large volume of data; for services or upon arrival of UL data with a short latency requirement; or for an initial system access associated with a high priority level access category or access class. The prioritized RA may be triggered by a PDCCH order, in which case the signaling of the subset of ROs the UE may use may consist of the PRACH Mask Index field in the DCI ordering the RA. Otherwise, if the subset of ROs is signaled in another way (as described above), the UE may only use a RO which is included in the signaled subset (as described above) and also allowed according to the PRACH Mask index field (if any) of the DCI ordering the RA.

In one embodiment, a new or modified PRACH configuration table includes short PRACH formats spanning only 1 PRACH occasion at the end of, or within, the PRACH slot. In case the PRACH configuration or RO is allocated for a 2-step RA, the associated msgA PUSCH resources can be configured to be close to the PRACH occasion within the PRACH slot (i.e., the gap between the RO and the MsgA PUSCH resources is shorter than a given threshold, e.g., 16 µs or 25 µs). In this embodiment, when modifying PRACH configuration tables, one column is added into the table to specify which subset of ROs are used by 2-step RA.

In one embodiment, some rules are defined to invalidate a 4-step RO when it collides with a 2-step RO, for minimizing the gap between msgA PUSCH and msgA preamble. In the case that the network separately configures 2-step ROs and 4-step ROs, and if it is the last 2-step RO in a PRACH slot that collides, then this RO is used for 2-step RA, else the RO is used for 4-step RA.

Figures 9, 10:
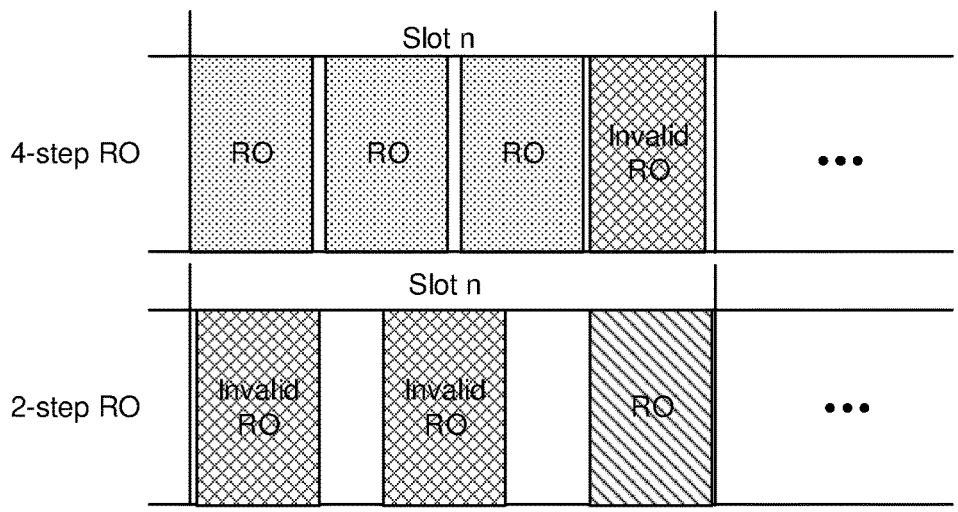
FIG. 9 is a block diagram depicting the collision of PRACH occasions between 2-step and 4-step RA.
FIG. 10 depicts one modification to Table 7.4-1 of 3GPP TS 38.321.

FIG. 9 depicts an example. In one PRACH slot, where ROs collide between 2-step and 4-step, the last colliding RO is only valid for 2-step RA. Other colliding ROs (that is, all but the last in the slot) are only valid for 4-step RA.

In one embodiment, a general rule for invalidating 4-step ROs states that if a 4-step RO collides with a 2-step RO which is configured with a gap to its associated msgA PUSCH resource allocation that is shorter than a given threshold (e.g. 16 µs or 25 µs), then the 4-step RO is invalidated. Otherwise, as one alternative, the colliding 2-step RO may be invalidated.

In one embodiment, a general rule for invalidating 4-step ROs states that if a 4-step RO collides with a 2-step RO which is configured with a gap to its associated msgA PUSCH resource allocation that is shorter than a given threshold (e.g. 16 µs or 25 µs), or if a 4-step RO collides with a msgA PUSCH resource allocation which is allocated with a gap from its preceding associated msgA preamble PRACH allocation (i.e., 2-step RO) which is less than a given threshold (e.g. 16 µs or 25 µs), then the 4-step RO is invalidated. Otherwise, as one alternative, the colliding 2-step RO, or the colliding msgA PUSCH allocation, may be invalidated.

In one embodiment, it is standardized that only the last RO configured is allowed for 2-step RA, for the case when 2-step ROs and 4-step ROs are shared and/or the case that 2-step RO and 4-step RO are separately configured. Alternatively, in some embodiments, the "last RO rule" is only applied when operating in unlicensed spectrum.

In one embodiment, a PRACH mask is used to indicate which RO of a PRACH configuration can be used. In this case, new fields can be added to Table 7.4-1 in 3GPP TS 38.321. For example, FIG. 10 depicts one modification of this table in which the specified PRACH Mask Index 11 indicates that only the last RO in a slot can be used, e.g. used as a 2-step RO.

In other embodiments, the table is modified to indicate "Last k ROs in a slot" or "All but last k RO in a slot".

If a specific numbering of RO is used (as in PRACH Mask Index 1-10), then the numbering is relative to the RO of the PRACH configuration or relative to ROs shared between different configurations.

FIG. 11 shows one embodiment, wherein the network has configured separate PRACH resources for 2-step and 4-step RA. PUSCH transmissions (shown in cross, diagonal, and vertical hatched pattern) follow the RACH occasions in time. The cross and diagonal hatched resources are closer to the RACH occasions and therefore more suitable to minimize LBT operations than the vertical hatched PUSCH transmissions. The vertical hatched PUSCH transmissions can be used for 4-step RACH operations, which have less stringent latency requirements. Note that in FIG. 11, 2-step ROs 1, 3, and 5 are overlapping between 2-step and 4-step RA. In another case (e.g., in licensed spectrum), the PRACH load on resources 1 and 5 from 2-step RA UEs could be high, since they may be used for UEs requiring larger msgA PUSCH sizes. In this example, it would be prudent to lower the PRACH load on these resources by not allowing 4-step UEs on these. A PRACH mask can be used to indicate which of the overlapping ROs can be used only by 2-step RA.

FIG. 12 shows another embodiment, in which the 2-step and 4-step RAs use the same PRACH configuration. However, the only ROs suitable for 2-step are those which have PUSCH resources immediately after the ROs, to minimize the gap for LBT. A PRACH mask can also be used in this case to indicate that the 2-step RA may only use odd ROs.

Furthermore, in any of these embodiments, the network may configure multiple masks to indicate multiple subsets of ROs for 2-step RAs. Each mask setting is associated with a gap range between PRACH preamble and MsgA PUSCH payload.

For RAs with higher priority levels or more critical latency requirements, a mask is applied that allows the UE to select ROs that give smaller gaps.

For RAs with lower priority levels or less critical latency requirements, a mask is applied that allows the UE to select ROs that give larger gaps.

In one embodiment, the UE fills the gap between the end of the PRACH transmission in a first slot by a cyclic extension of the PUSCH transmission in a second slot, wherein the second slot occurs immediately or with a gap less than 16 us after the first slot (i.e., the UE does this to keep the channel occupied so that it does not risk losing the channel before transmitting msgA PUSCH). The cyclic extension may be an extended cyclic prefix of msgA PUSCH. The the PRACH transmission and the PUSCH transmission may both start in the same slot, and the gap is occupied by a cyclic extension of the PUSCH transmission.

In one embodiment, implemented in a UE, a resource allocation of msgA PUSCH is located close to the PRACH occasion to ensure a minimum duration of gap, e.g., 16 us or 25 us. In one embodiment, the msgA PUSCH is a TypeB PUSCH mapping (mini-slot) occurring in a subset of symbols of the PRACH slot that occur after the end of the PRACH transmission.

In one embodiment, the msgA PUSCH is scheduled across the PRACH slot and the succeeding slot. Where the scheduling of the msgA PUSCH crosses two slots, different options are available. In one embodiment, one coded bit stream is divided into two parts; the first part is modulated and mapped to the first slot, and the second part is modulated and mapped to the second slot. In another embodiment, the TB is divided into two parts; the first and second part are coded and modulated separately, and mapped to two slots, respectively. In yet another embodiment, two same TBs are repeated across two slots.

In some embodiments, the msgA PUSCH resource is cell-specifically reserved, while in other embodiments, e.g., for UEs in RRC connected mode, the resource is dynamically scheduled.

Figure 13:
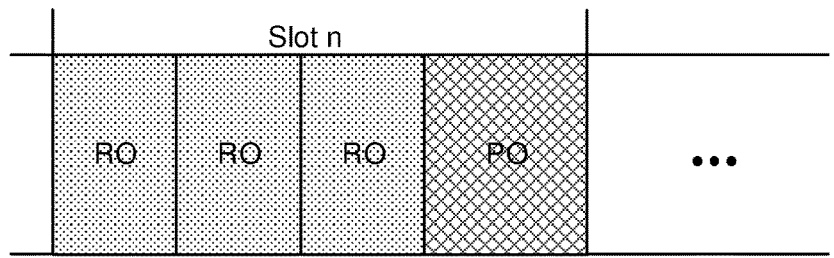
FIG. 13 is a block diagram showing RO and PO in the same PRACH slot.

FIG. 13 depicts an example. In one PRACH slot, 3 ROs and one PUSCH occasion (PO) are allocated with same numerology, where each RO occupies 3 OFDM symbols, while the PO occupies 5 symbols.

Figure 14:
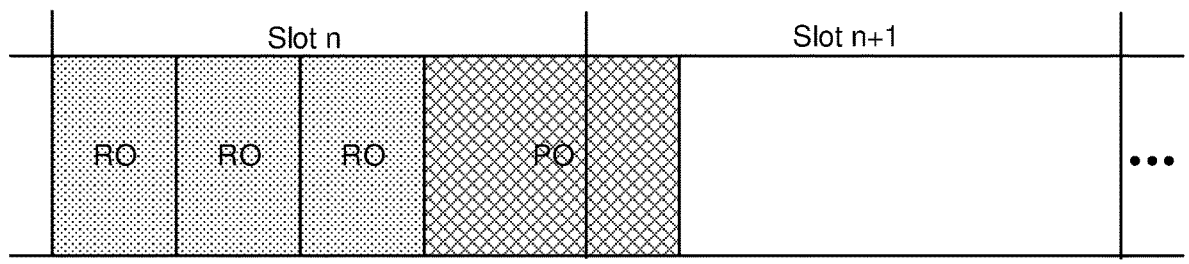
FIG. 14 is a block diagram showing RO and PO in the same PRACH slot, where the PO crosses a slot boundary.

FIG. 14 depicts another example, where ROs are scheduled in the first slot, and the PO is scheduled across two slots.

FIG. 15 depicts a method 100 of performing a Random Access (RA) procedure, in accordance with particular embodiments. The method is performed by a wireless device operative in a wireless communication network. Signalling indicating a plurality of pre-configured Random Access Channel (RACH) occasions (RO), which are candidates for specific Physical Random Access Channel (PRACH) transmissions of a 2-step or prioritized RA procedure, is received from the network (block 102). An RA preamble is transmitted to the network in one of the plurality of pre-configured ROs (block 104).

FIG. 16 depicts a method 200 of participating in a Random Access (RA) procedure, in accordance with particular embodiments. The method is performed by a base station operative in a wireless communication network. Signalling indicating a plurality of pre-configured Random Access Channel (RACH) occasions (RO) which are candidates for specific Physical Random Access Channel (PRACH) transmissions of a 2-step or prioritized RA procedure, is sent to one or more wireless devices (block 202). An RA preamble is received from a wireless device in one of the plurality of pre-configured ROs (block 204).

Note that apparatuses described herein may perform the methods 100, 200 herein and any other processing by implementing any functional means, modules, units, or circuitry. In one embodiment, for example, the apparatuses comprise respective circuits or circuitry configured to perform the steps shown in FIGS. 15 and 16. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 17:
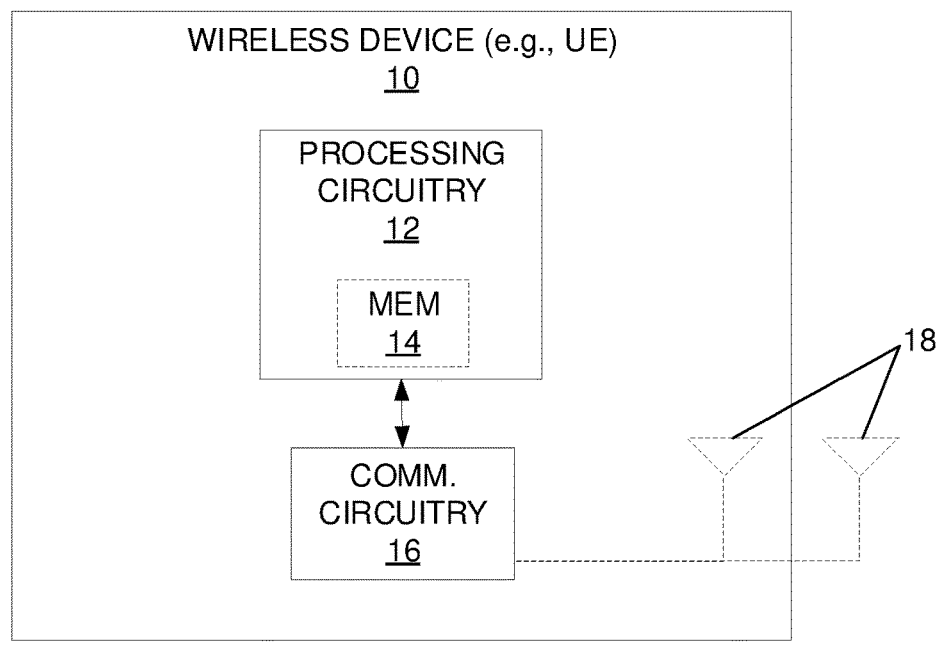
FIG. 17 is a hardware block diagram of a wireless device.

FIG. 17 for example illustrates a hardware block diagram of a wireless device 10 as implemented in accordance with one or more embodiments. As shown, the wireless device 10 includes processing circuitry 12 and communication circuitry 16. The communication circuitry 16 (e.g., radio circuitry) is configured to transmit and/or receive information to and/or from one or more other nodes, e.g., via any communication technology. Such communication may occur via one or more antennas 18 that are either internal or external to the wireless device 10, as indicated by the dashed lines. The processing circuitry 12 is configured to perform processing described above, such as by executing instructions stored in memory 14. The processing circuitry 12 in this regard may implement certain functional means, units, or modules.

Figure 18:
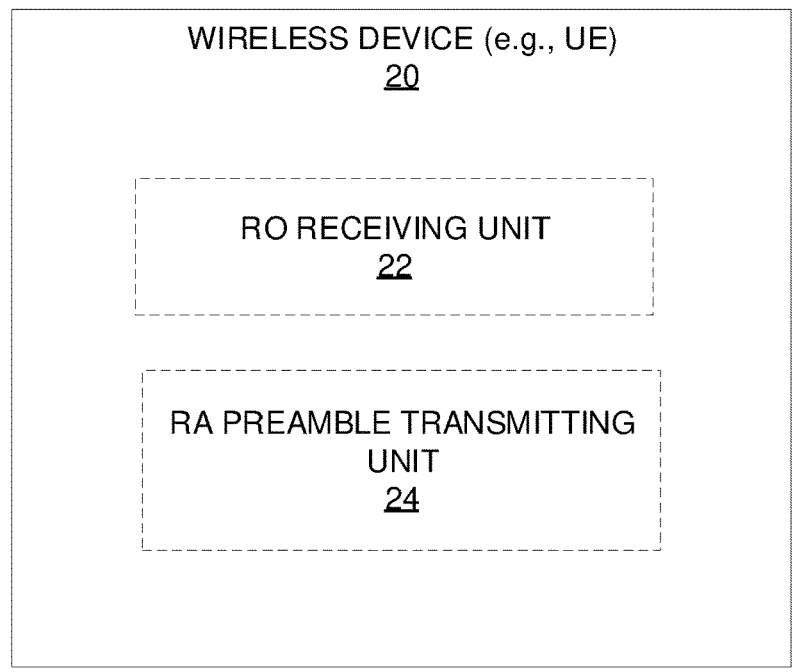
FIG. 18 is a functional block diagram of a wireless device.
Figure 21:
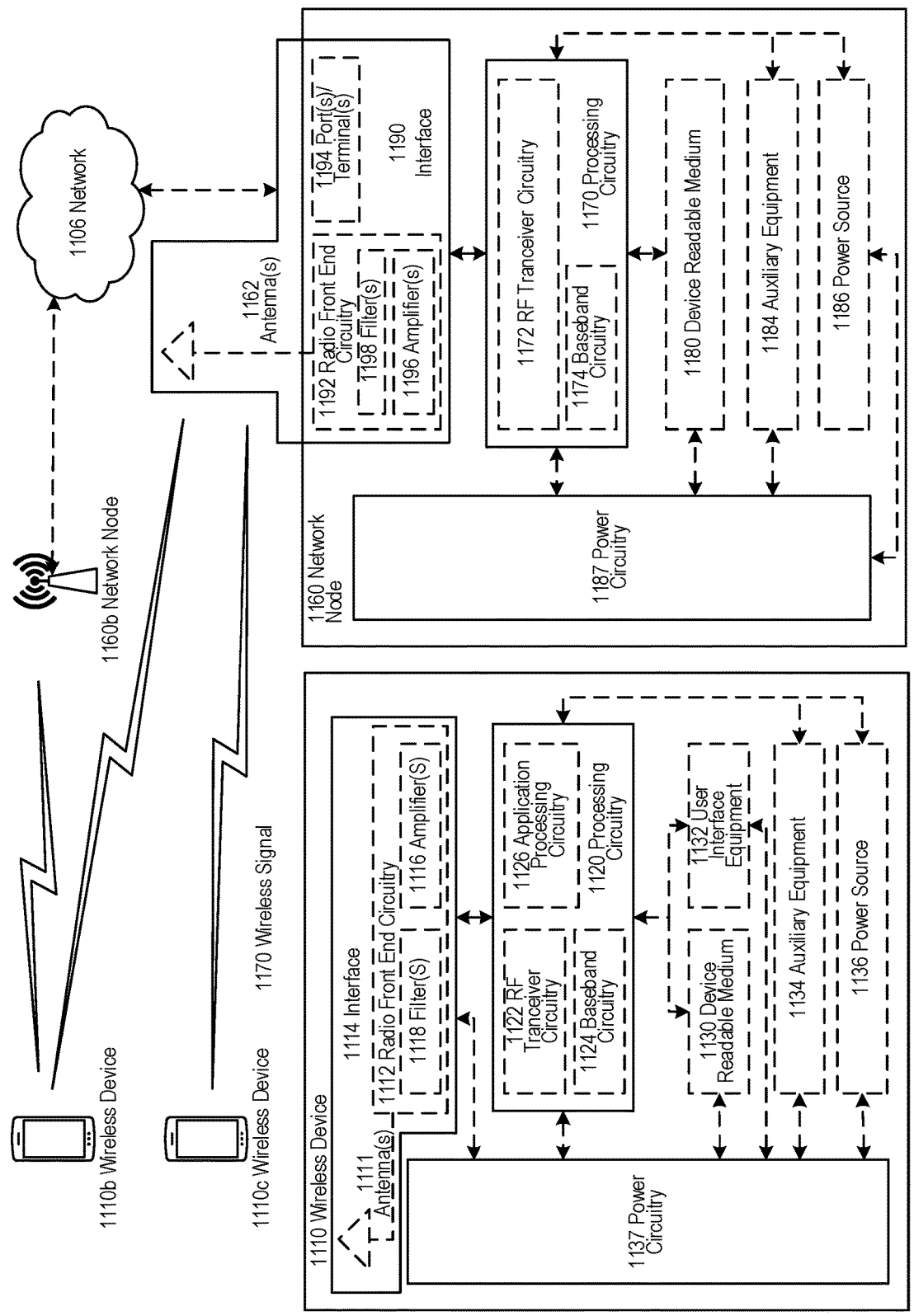
FIG. 21 is a diagram of a wireless network.

FIG. 18 illustrates a functional block diagram of a wireless device 20 operative in a wireless network according to still other embodiments (for example, the wireless network shown in FIG. 21). As shown, the wireless device 20 implements various functional means, units, or modules, e.g., via the processing circuitry 12 in FIG. 17 and/or via software code. These functional means, units, or modules, e.g., for implementing the method 100 herein, include for instance: RO receiving unit 22 and RA preamble transmitting unit 24. RO receiving unit 22 is configured to receive signalling indicating a plurality of pre-configured Random Access Channel (RACH) occasions (RO) which are candidates for specific Physical Random Access Channel (PRACH) transmissions for a 2-step or prioritized RA procedure. RA preamble transmitting unit 24 is configured to transmit to the network an RA preamble in one of the plurality of pre-configured ROs.

Figure 19:
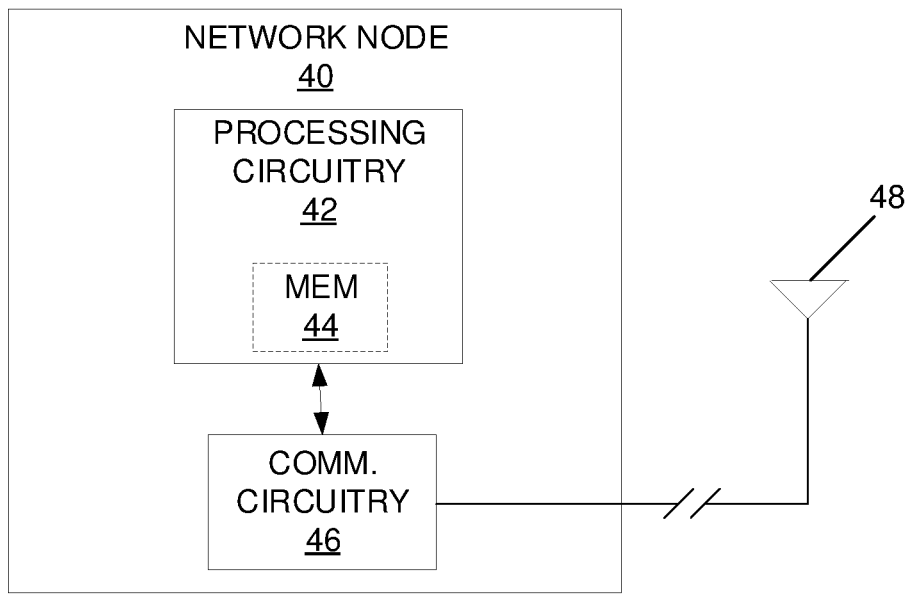
FIG. 19 is a hardware block diagram of a base station.

FIG. 19 illustrates a hardware block diagram of a network node 40 as implemented in accordance with one or more embodiments. As shown, the network node 40 includes processing circuitry 42 and communication circuitry 46. The communication circuitry 46 is configured to transmit and/or receive information to and/or from one or more other nodes, e.g., via any communication technology. The communication circuitry 46 is further configured to transmit and/or receive information to and/or from one or more wireless devices 10, 20, via one or more antennas 48. As indicated by the broken line, the antennas 48 may be located remotely from the network node 40, such as on a tower or building. The processing circuitry 42 is configured to perform processing described above, such as by executing instructions stored in memory 44. The processing circuitry 42 in this regard may implement certain functional means, units, or modules.

Figure 20:
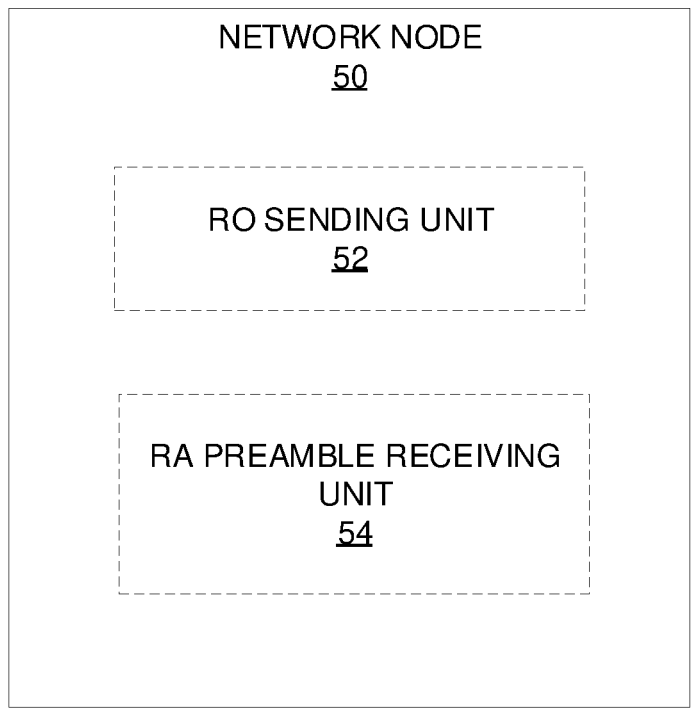
FIG. 20 is a functional block diagram of a base station.

FIG. 20 illustrates a functional block diagram of a network node 50 in a wireless network according to still other embodiments (for example, the wireless network shown in FIG. 21). As shown, the network node 50 implements various functional means, units, or modules, e.g., via the processing circuitry 42 in FIG. 19 and/or via software code. These functional means, units, or modules, e.g., for implementing the method(s) herein, include for instance: RO sending unit 52 and RA preamble receiving unit 58. RO sending unit 52 is configured to send, to one or more wireless devices, signalling indicating a plurality of pre-configured Random Access Channel (RACH) occasions (RO) which are candidates for specific Physical Random Access Channel (PRACH) transmissions for a 2-step or prioritized RA procedure. RA preamble receiving unit 54 is configured to receive, from a wireless device, an RA preamble in one of the plurality of pre-configured ROs.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention present numerous advantages over the prior art. The ability to configuring RO with no or only a short gap (e.g., ≤25 µs) between RO and PUSCH, enables msgA transmission with only one LBT or one LBT plus an additional short (25 µs) LBT. This allows the latency of a 2-step RACH procedure to be minimized when operating in unlicensed spectrum, because the msg A PUSCH transmission is not blocked by LBT failure, which otherwise would have triggered the gNB to fall back to 4-step RA (due to receiving a msg A preamble but no msg A PUSCH). Embodiments facilitate implementation by configuring a subset of shared RO to be used only by 2-step or 4-step UEs, enabling only 2-step UEs using a subset of RO. Additionally, a subset of RO of a PRACH configuration may be configured for use.

Network Description and Over the Top Transmissions

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network QQ106, network nodes QQ160 and QQ160b, and wireless devices (WD) QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 21 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 22:
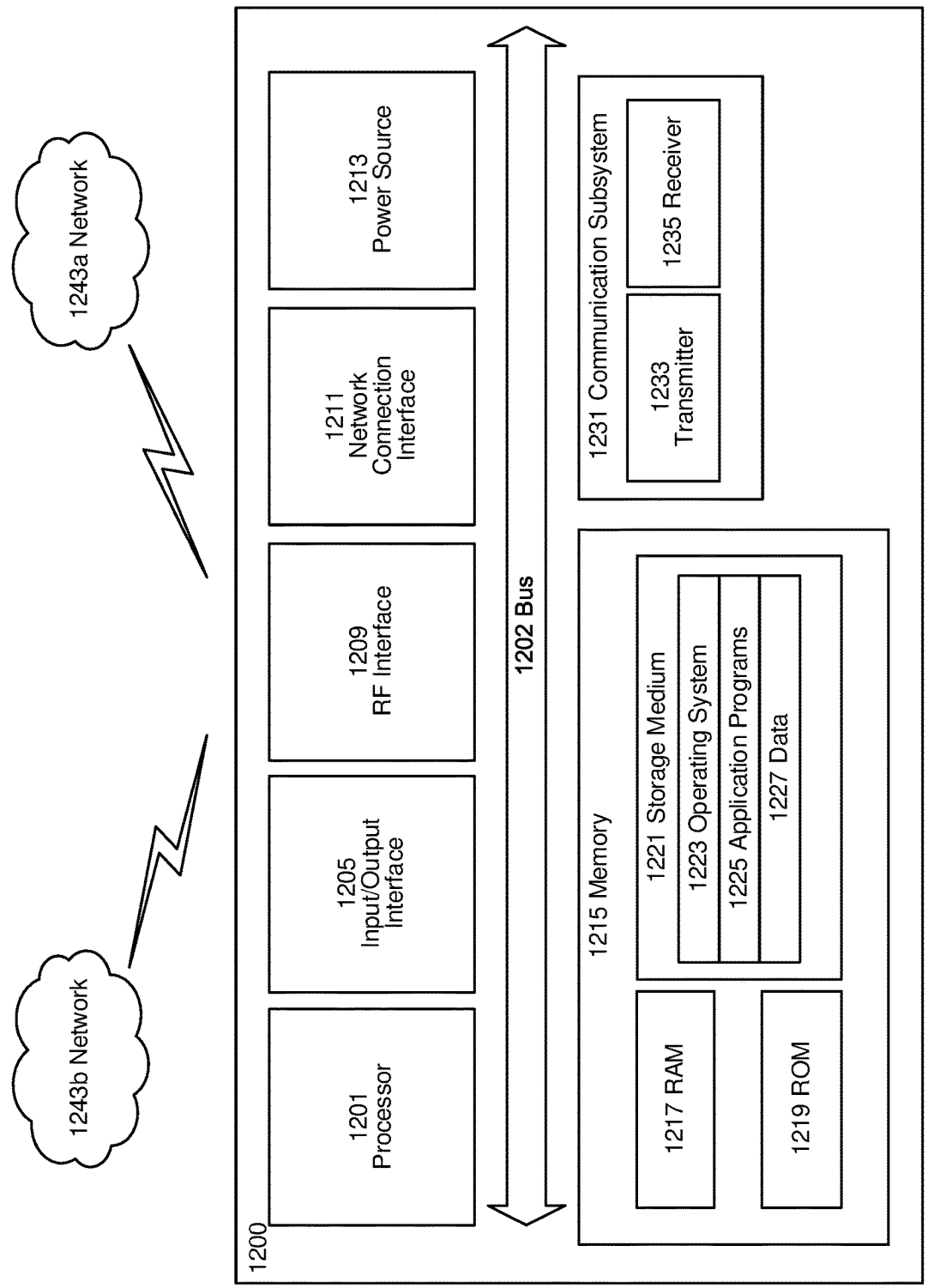
FIG. 22 is a block diagram of a UE.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 22, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 22, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 23:
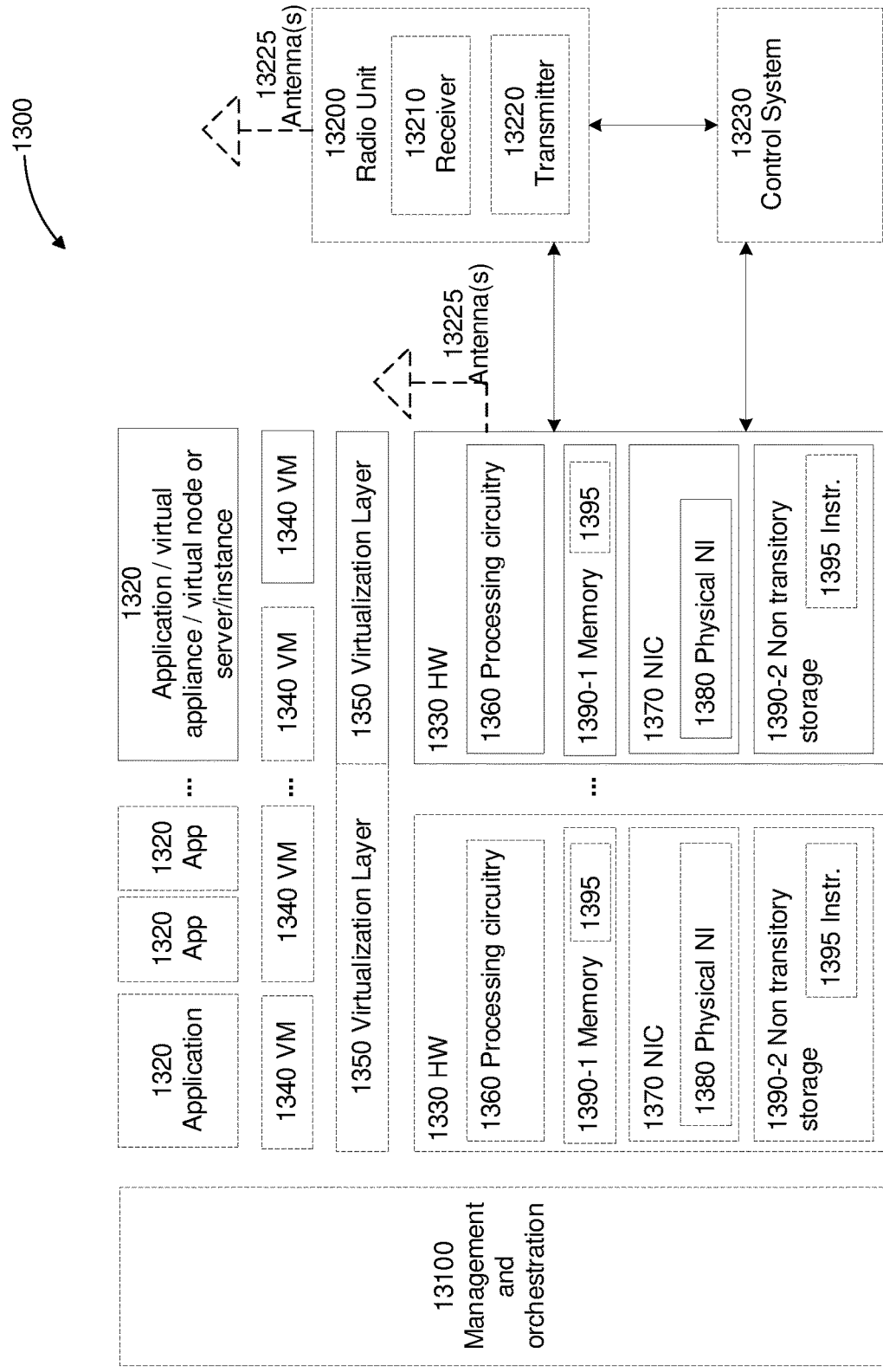
FIG. 23 is a schematic block diagram illustrating a virtualization environment.

FIG. 23 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 23, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 23.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 24:
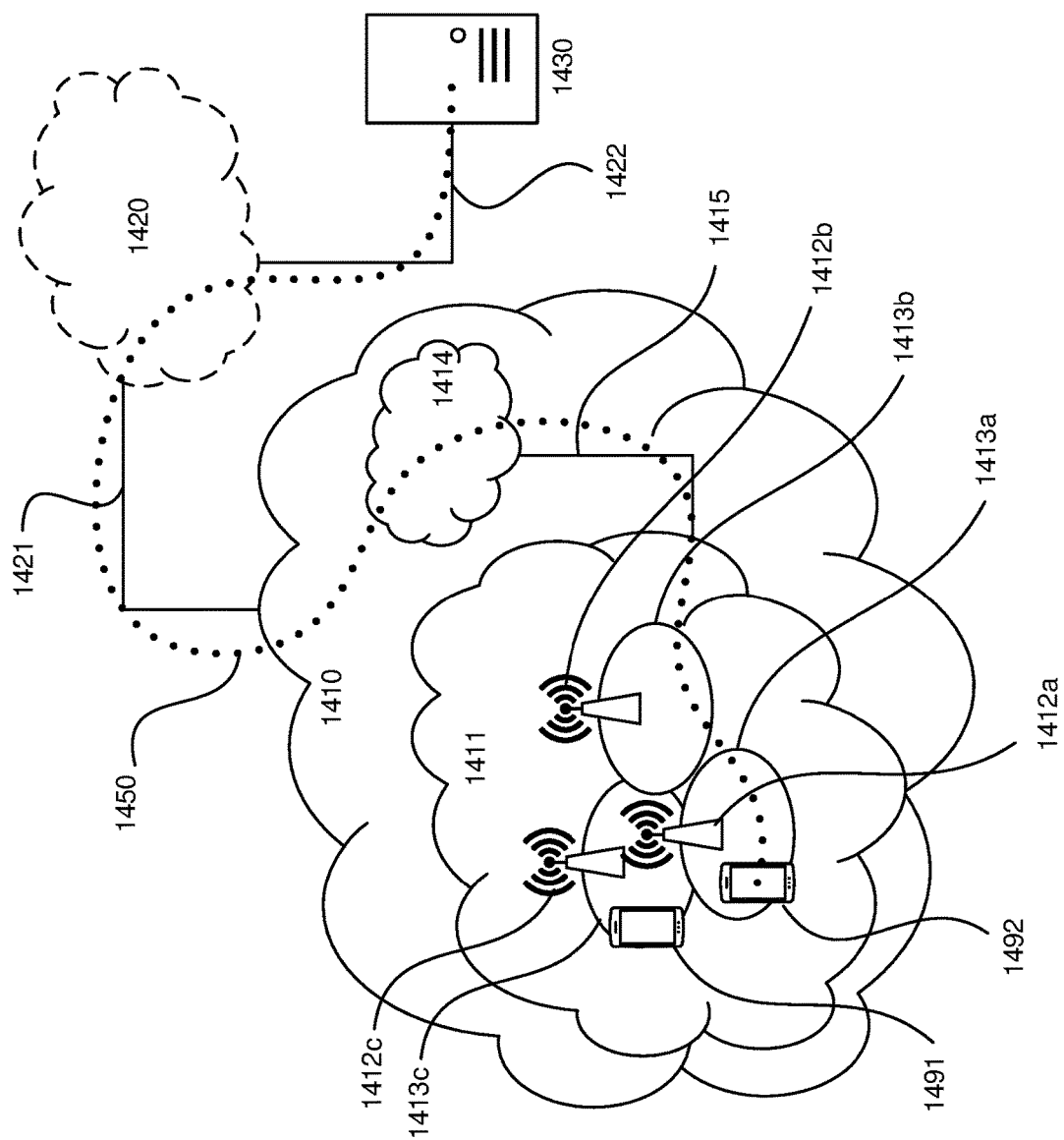
FIG. 24 illustrates a telecommunication network connected via an intermediate network to a host computer.

FIG. 24 illustrates a telecommunication network connected via an intermediate network to a host computer in accordance with some embodiments. In particular, with reference to FIG. 24, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 24 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 25:
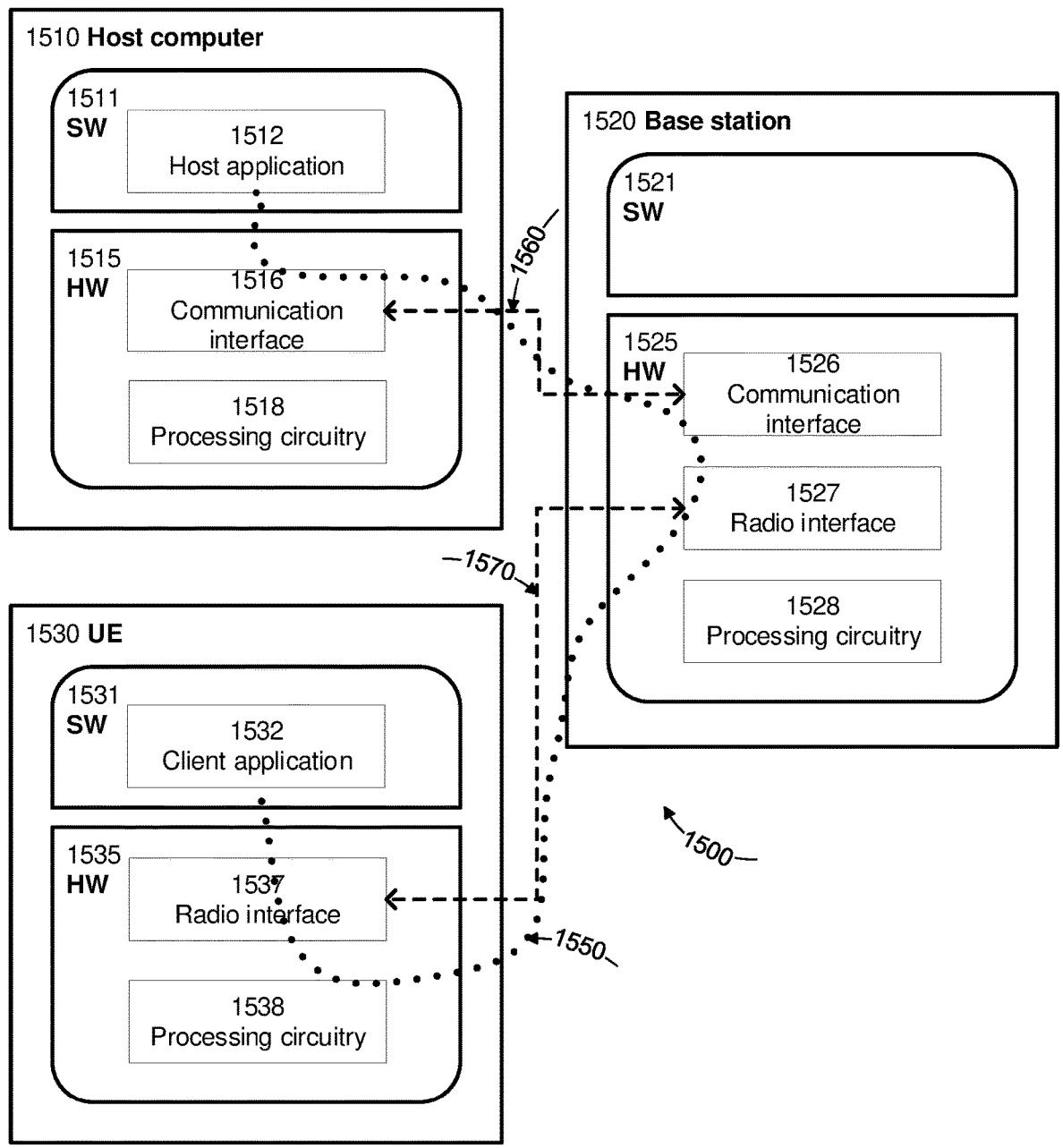
FIG. 25 illustrates host computer communicating via a base station with a user equipment over a partially wireless connection.

Example implementations, in accordance with an embodiment, of the UE, base station and host computer discussed in the preceding paragraphs will now be described with reference to FIG. 25. FIG. 25 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 25) served by base station QQ520. Communication interface QQ526 may be configured to facilitate connection QQ560 to host computer QQ510. Connection QQ560 may be direct or it may pass through a core network (not shown in FIG. 25) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 25 may be similar or identical to host computer QQ430, one of base stations QQ412a, QQ412b, QQ412c and one of UEs QQ491, QQ492 of FIG. 24, respectively. This is to say, the inner workings of these entities may be as shown in FIG. 25 and independently, the surrounding network topology may be that of FIG. 24.

In FIG. 25, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency and ability to operate unlicensed spectrum and thereby provide benefits such as greater operational flexibility, reduced user waiting time, and enhanced services.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 26:
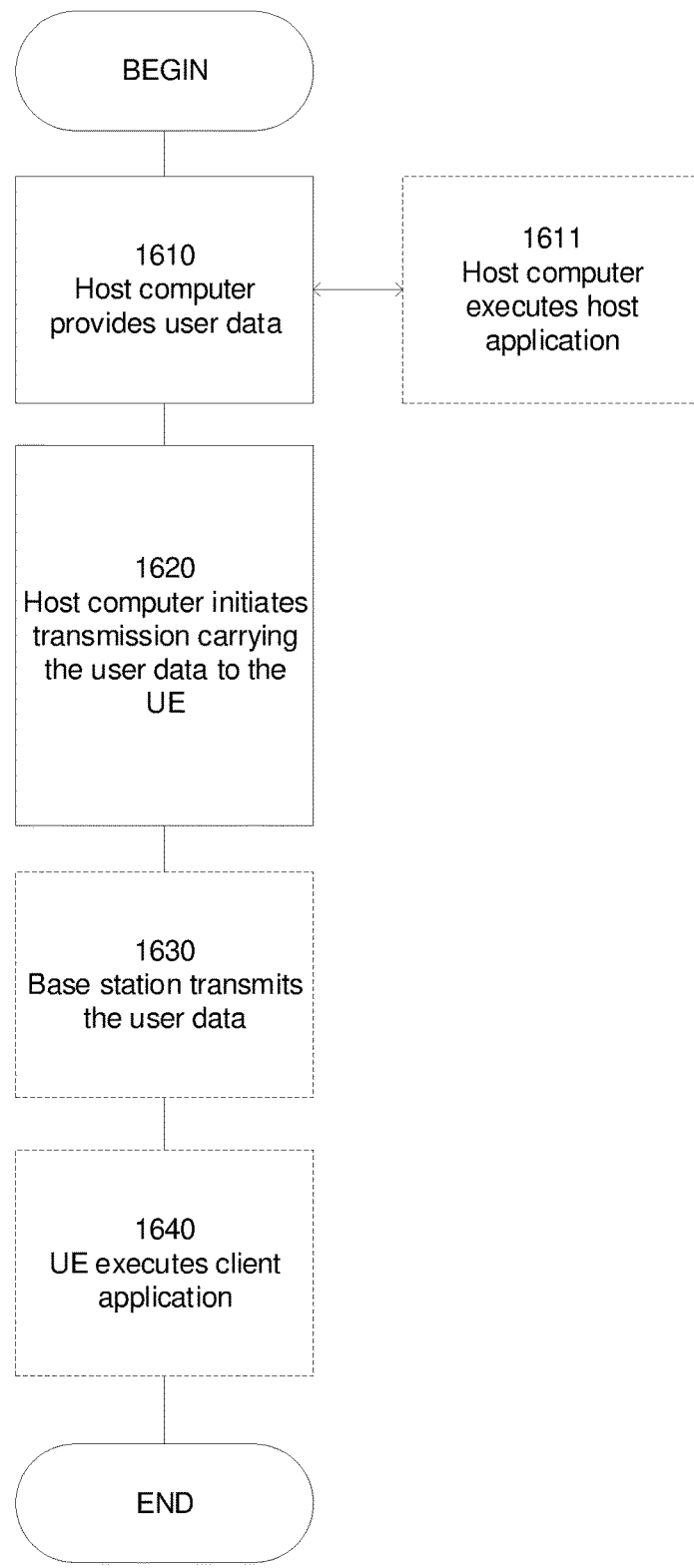
FIG. 26 is a flowchart illustrating a method implemented in a communication system.

FIG. 26 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 26 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 27:
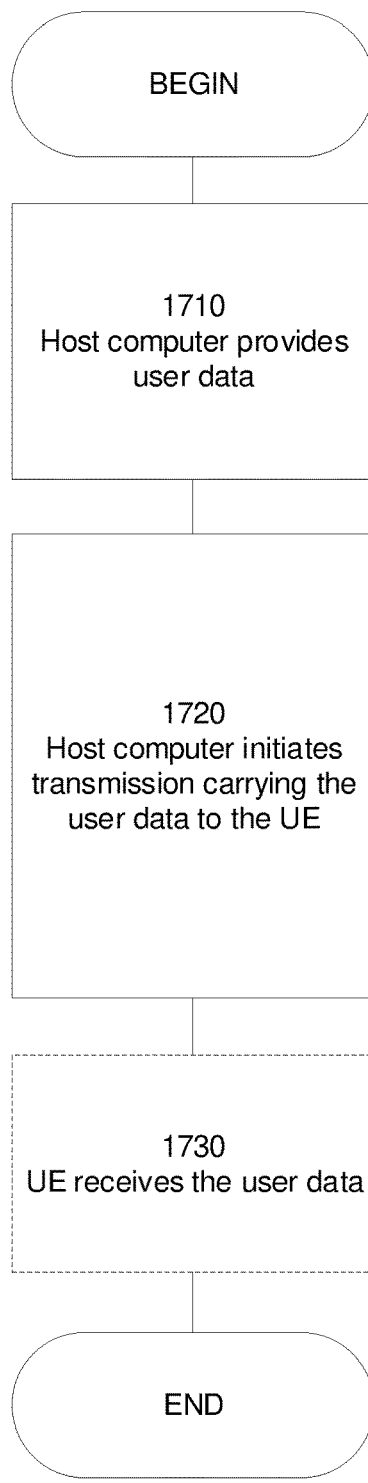
FIG. 27 is a flowchart illustrating another method implemented in a communication system.

FIG. 27 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 27 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 28:
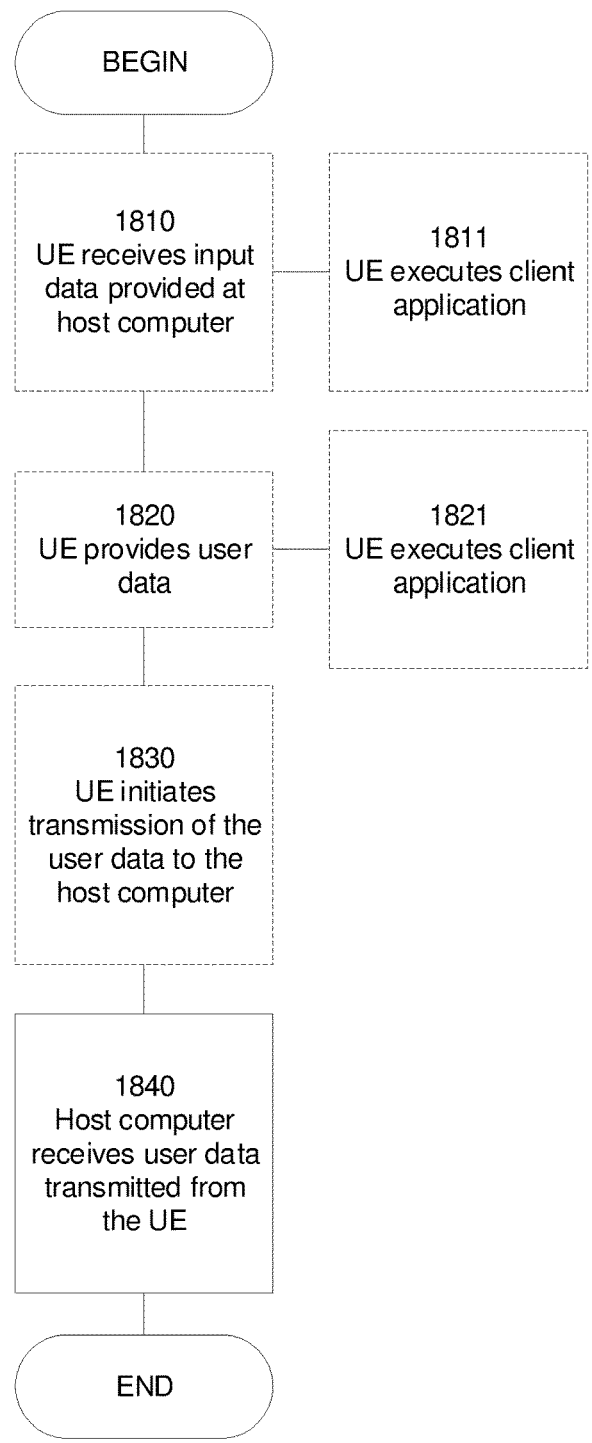
FIG. 28 is a flowchart illustrating yet another method implemented in a communication system.

FIG. 28 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 28 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 29:
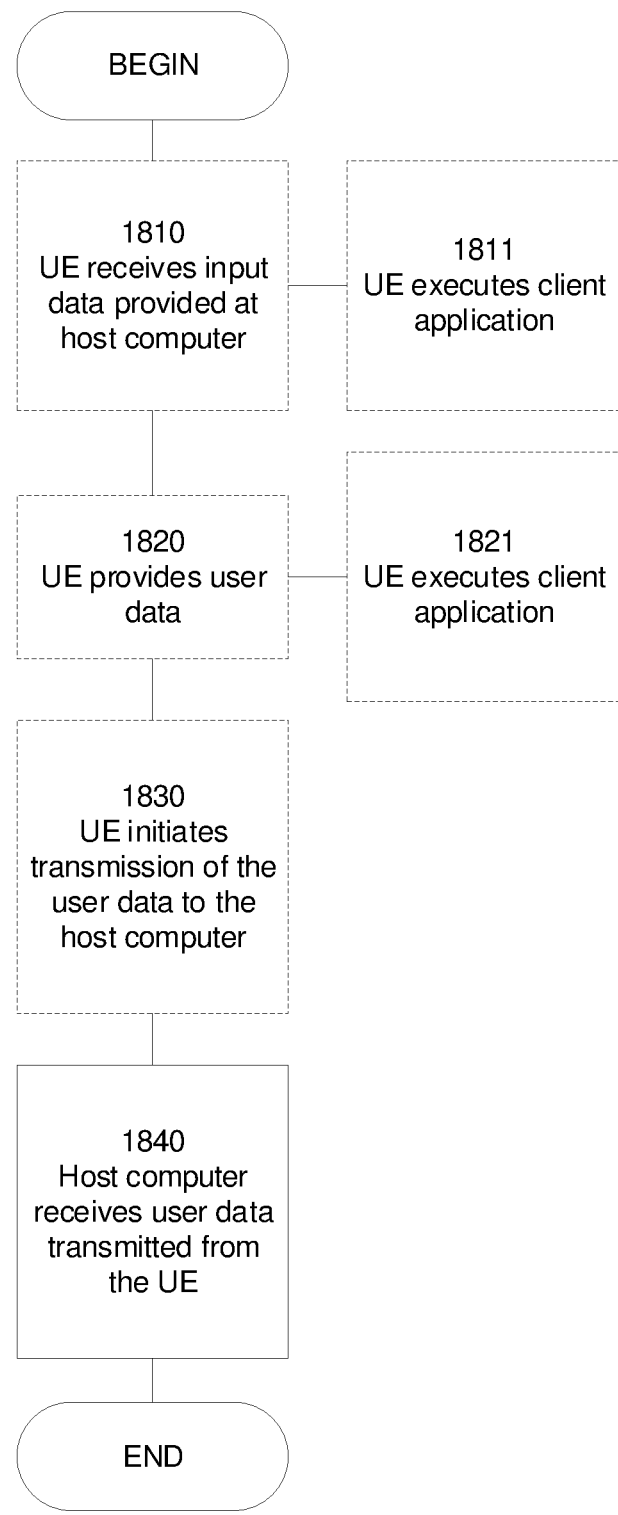
FIG. 29 is a flowchart illustrating still another method implemented in a communication system.

FIG. 29 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 29 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ACK Acknowledgement (HARQ)
BCH Broadcast Channel
BSR Buffer Status Report
CBRA Contention Based RACH
CFRA Contention Free RACH
CCA Clear Channel Assessment
COT Channel Occupancy Time
CP Cyclic Prefix
CQI Channel Quality information
C-RNTI Cell RNTI
CRM Contention Resolution Message
CSI Channel State Information
DL Downlink
DMRS Demodulation Reference Signal
ED Energy Detection
eNB E-UTRAN NodeB
FDD Frequency Division Duplex
FFS For Further Study
gNB next generation base station (in NR)
HARQ Hybrid Automatic Repeat Request
HO Handover
IE Information Element
LAA License Assisted Access
LBT Listen-Before-Talk
LTE Long Term Evolution
M2M Machine to Machine
MAC Medium Access Control
MCOT Maximum Channel Occupancy Time
MIB Master Information Block
Msg/msg Message
MTC Machine Type Communication
NACK Negative Acknowledgement (HARQ)
NR New Radio
NR-U NR Unlicensed (NR operated in unlicensed spectrum.)
NW Network
OFDM Orthogonal Frequency Division Multiplexing
OFDMA Orthogonal Frequency Division Multiple Access
PBCH Physical Broadcast Channel
PO PUSCH Occasion
PRACH Physical Random Access Channel
PSS Primary Synchronization Signal
PUCCH Physical Uplink Control Channel
PUSCH Physical Uplink Shared Channel
RA Random Access
RACH Random Access Channel
RAN Radio Access Network
RAR Random Access Response
RAT Radio Access Technology
RNTI Radio Network Temporary Identifier
RO RACH Occasion
RRC Radio Resource Control
RRM Radio Resource Management
SCH Synchronization Channel
SCell Secondary Cell
SI System Information
SIB System Information Block
SR Scheduling Request
SS Synchronization Signal
SSB Synchronization Signal Block
SSS Secondary Synchronization Signal
TDD Time Division Duplex
TSS Tertiary Synchronization Signal
TXOP Transmit Opportunity
UE User Equipment
UL Uplink

REPRESENTATIVE EMBODIMENTS

Group A Embodiments

1. A method, performed by a wireless device operative in a wireless communication network, of performing a Random Access (RA) procedure, the method comprising:
   receiving signalling indicating a plurality of pre-configured Random Access Channel (RACH) occasions (RO) which are candidates for specific Physical Random Access Channel (PRACH) transmissions;
   receiving signalling indicating a plurality of Physical Uplink Shared Channel (PUSCH) occasions (PO), each comprising a plurality of periodically recurring symbols in which a PUSCH transmission may occur;
   receiving signalling indicating a subset of RA resources, each comprising one of the pre-configured RO immediately followed by a first symbol of one of the PO;
   selecting a RA preamble in the indicated subset of RA resources;
   transmitting to the network the selected RA preamble in one of the plurality of pre-configured ROs; and
   transmitting to the network a PUSCH transmission in the associated PO.
2. The method of embodiment 1 wherein a PUSCH transmission that may occur in a PO comprises one of uplink data and a demodulation reference symbol (DMRS) associated with the PUSCH.
3. The method of any of embodiments 1-2 wherein receiving signalling indicating a plurality of pre-configured ROs comprises receiving the indication in a broadcast by the network.
4. The method of any of embodiments 1-2 wherein receiving signalling indicating a plurality of pre-configured ROs comprises receiving the indication in dedicated signalling by the network.
5. The method of any of embodiments 1-2 wherein receiving signalling indicating a plurality of pre-configured ROs comprises receiving the indication in one of a Media Access Control (MAC) Control Element (CE) or Downlink Control Information (DCI) transmitted by the network.
6. The method of any of embodiments 1-5 wherein the indication of a plurality of pre-configured ROs includes a flag indicating whether the plurality of candidate ROs includes only the last RO in a RACH slot or all ROs of the plurality of candidate ROs.
7. The method of any of embodiments 1-5 wherein the indication of a plurality of pre-configured ROs includes an integer $N \geq 1$ indicating that the plurality of candidate ROs consists of the last N ROs in a RACH slot.
8. The method of any of embodiments 1-5 wherein the indication of a plurality of pre-configured ROs includes a bitmask indicating which pre-configured ROs are candidates for specific PRACH transmissions.
9. The method of any of embodiments 1-8 wherein the selected RA preamble transmitted in a pre-configured RO is associated with a 2-step RA procedure.
10. The method of any of embodiments 1-9 wherein the selected RA preamble transmitted in a pre-configured RO is associated with a prioritized RA procedure.

11. The method of embodiment 10 wherein the prioritized RA procedure is a RA triggered for handover.
12. The method of embodiment 10 wherein the prioritized RA procedure is a RA triggered for Beam Failure Recovery (BFR).
14. The method of embodiment 10 wherein the prioritized RA procedure is a RA triggered for a service with a priority level exceeding a predetermined threshold.
15. The method of embodiment 10 wherein the prioritized RA procedure is a RA triggered for a Buffer Status Report (BSR) reporting a volume of data in excess of a predetermined threshold.
16. The method of embodiment 10 wherein the prioritized RA procedure is a RA triggered for services or uplink data having a latency requirement in excess of a predetermined threshold.
17. The method of embodiment 10 wherein the prioritized RA procedure is a RA triggered for handover.
18. The method of embodiment 10 wherein the prioritized RA procedure is a RA triggered for initial system access associated with a high priority level access category or access class.
19. The method of embodiment 10 wherein the prioritized RA procedure is a RA triggered by a Physical Downlink Control Channel (PDCCH) order, and wherein the signalling indicating a plurality of pre-configured ROs the wireless device may use consists of a PRACH Mask Index field of a DCI ordering the RA.
20. The method of embodiment 1 wherein the signalling indicating a plurality of pre-configured ROs includes or references a new or modified PRACH configuration table that includes short PRACH formats spanning only one PRACH occasion at the end of or within a PRACH slot.
21. The method of embodiment 20 wherein the PRACH configuration or RO is allocated for a 2-step RA, and the associated msgA PUSCH resources can be configured to follow the PRACH occasion within the PRACH slot within 25 μs or less.
22. The method of embodiment 21 wherein the associated msgA PUSCH resources can be configured to follow the PRACH occasion within the PRACH slot within 16 μs or less.
23. The method of embodiment 20 wherein the PRACH configuration table includes a column specifying which subset of ROs is used for 2-step RA.
24. The method of embodiment 1 wherein the plurality of pre-configured ROs comprises separately configured 2-step ROs for use in 2-step RA and 4-step ROs for use in 4-step RA.
25. The method of embodiment 24, further comprising, for each collision between 2-step ROs and 4-step ROs:
    if the colliding 2-step RO is the last 2-step RO in a PRACH slot, invalidating colliding 4-step ROs and using the 2-step RO for 2-step RA; and
    if the colliding 2-step RO is other than the last 2-step RO in a PRACH slot, invalidating the 2-step ROs and using the 4-step RO for 4-step RA.
26. The method of embodiment 24, further comprising, for each collision between 2-step ROs and 4-step ROs:
    if the colliding 2-step RO is configured with a gap until the first symbol of an associated PUSCH transmission of less than 25 usec, invalidating colliding 4-step ROs and using the 2-step RO for 2-step RA; and
    otherwise, invalidating the 2-step ROs and using the 4-step RO for 4-step RA.
27. The method of embodiment 26, further comprising invalidating colliding 4-step ROs if the colliding 2-step RO is configured with a gap until the first symbol of an associated PUSCH transmission of less than 16 usec.
28. The method of embodiment 26, further comprising:
    if a 4-step RO collides with a 2-step msgA PUSCH resource allocation that is allocated with a gap from its associated preceding 2-step RO of less than 25 usec, invalidating colliding 4-step ROs and using the 2-step RO for 2-step RA; and
    otherwise, invalidating the colliding msgA PUSCH resource allocation and using the 4-step RO for 4-step RA.
29. The method of embodiment 28, further comprising invalidating the colliding 4-step RO if the gap from the 2-step msgA PUSCH resource allocation to its associated preceding 2-step RO is less than 16 usec.
30. The method of embodiment 1, wherein the plurality of pre-configured ROs comprises shared or separately configured 2-step ROs for use in 2-step RA and 4-step ROs for use in 4-step RA, further comprising:
    selecting only the last 2-step RO in a PRACH slot for 2-step RA.
31. The method of embodiment 30 wherein selecting only the last 2-step RO in a PRACH slot for 2-step RA comprises selecting only the last 2-step RO in a PRACH slot only if the wireless device is operating in unlicensed spectrum.
32. The method of embodiment 1 wherein the signalling indicating a plurality of pre-configured ROs comprises a PRACH mask indicating which RO of a PRACH configuration can be used.
33. The method of embodiment 32 wherein the PRACH mask index indicates that only the last RO in a PRACH slot can be used.
34. The method of embodiment 32 wherein the a PRACH mask index indicates that only the last k ROs in a PRACH slot can be used, where K is an integer 1.
35. The method of embodiment 32 wherein the PRACH mask index indicates that all ROs other than the RO in a PRACH slot can be used.
36. The method of embodiment 32 wherein the PRACH mask index indicates that all ROs other than the RO in a PRACH slot can be used.
35. The method of embodiment 32 wherein the PRACH mask identifies, as ROs that can be used for 2-step RA, only the ROs having an associated PUSCH resource allocation that immediately follows the RO.
36. The method of embodiment 35 wherein the PRACH mask identifies, as ROs that can be used for 2-step RA, only the ROs having an associated PUSCH resource allocation that follows the RO with a gap of 25 usec or less.
37. The method of embodiment 1 further comprising:
    transmitting, in a gap between the RA preamble transmission and the PUSCH transmission, a cyclic extension so as to reduce the gap to 25 usec or less.
38. The method of embodiment 37 wherein the cyclic extension is an extended cyclic prefix of a msgA PUSCH transmission of a 2-step RA.
39. The method of embodiment 37 wherein the PRACH transmission and the PUSCH transmission both start in the same slot.
40. The method of embodiment 1 wherein the resource allocations of the PRACH transmission and PUSCH transmission are within 25 usec in the time domain.

41. The method of embodiment 40 wherein the resource allocations of the PRACH transmission and PUSCH transmission are within 16 usec in the time domain.
42. The method of embodiment 40 wherein the PUSCH transmission conforms to a TypeB PUSCH mapping and occurs in a subset of symbols of the PRACH slot that occurs after the end of the associated PRACH transmission.
43. The method of embodiment 40 wherein the PUSCH transmission occupies at least part of the PRACH slot of associated PRACH transmission and at least part of the following slot.
44. The method of embodiment 43 further comprising:
dividing the coded bitstream of the PUSCH transmission into first and second parts;
modulating and mapping the first part to the first slot; and
modulating and mapping the second part to the second slot.
45. The method of embodiment 43 further comprising:
dividing the Transport Block (TB) of the PUSCH transmission into first and second parts;
coding and modulating the first part;
coding and modulating the second part; and
mapping the coded and modulated first and second parts to the two slots, respectively.
46. The method of embodiment 43 further comprising repeating the Transport Block (TB) of the PUSCH transmission across the two slots.
47. The method of embodiment 1 wherein the PUSCH resource is cell-specifically reserved.
48. The method of embodiment 1 wherein the PUSCH resource is dynamically scheduled.
49. The method of embodiment 1, wherein the wireless device uses an earlier RO for 4-step RA, further comprising:
selecting an RO not in the plurality of pre-configured ROs signalled by the network;
transmitting a different RA preamble in the selected RO;
receiving signalling identifying a single instance of resources in which to transmit the PUSCH; and
transmitting the PUSCH to the network on the identified single instance of resources.
50. The method of embodiment 1, wherein the one or more 4-step ROs are invalidated by one or more 2-step ROs, wherein:
the plurality of pre-configured ROs is identified by a first configuration signalled to the UE; and
the subset of RA resources comprises one or more ROs wherein the UE may only transmit a RA preamble associated with the PUSCH.
51. The method of embodiment 1, wherein the wireless device uses only the last RO and that is adjacent to PUSCH, wherein the subset of RA resources is comprised in exactly one RO of the plurality of pre-configured ROs.
52. The method of embodiment 1, wherein the ROs and POs are within a slot, wherein the plurality of ROs and the PUSCH together are contained within a slot and having a same subcarrier spacing, where the slot is comprised of a number of OFDM symbols that does not vary with the subcarrier spacing for a given cyclic prefix length.

AA. The method of any of the previous embodiments, further comprising:
providing user data; and
forwarding the user data to a host computer via the transmission to the base station.

Group B Embodiments [Numbering Intentionally Skipped to 101]

101. A method, performed by a base station operative in a wireless communication network, of participating in a Random Access (RA) procedure, the method comprising:
sending, to one or more wireless devices, signalling indicating a plurality of pre-configured Random Access Channel (RACH) occasions (RO) which are candidates for specific Physical Random Access Channel (PRACH) transmissions;
sending, to one or more wireless devices, signalling indicating a plurality of Physical Uplink Shared Channel (PUSCH) occasions (PO), each comprising a plurality of periodically recurring symbols in which a PUSCH transmission may occur;
sending, to one or more wireless devices, signalling indicating a subset of RA resources, each comprising one of the pre-configured RO immediately followed by a first symbol of one of the PO;
receiving, from a wireless device, a RA preamble selected from the indicated subset of RA resources, in one of the plurality of pre-configured ROs; and
receiving, from the wireless device, a PUSCH transmission in the associated PO.
102. The method of embodiment 101 wherein a PUSCH transmission that may occur in a PO comprises one of uplink data and a demodulation reference symbol (DMRS) associated with the PUSCH.
103. The method of any of embodiments 101-102 wherein sending, to one or more wireless devices, signalling indicating a plurality of pre-configured ROs comprises sending the indication in a broadcast.
104. The method of any of embodiments 101-102 wherein sending, to one or more wireless devices, signalling indicating a plurality of pre-configured ROs comprises sending the indication in dedicated signalling.
105. The method of any of embodiments 101-102 wherein sending, to one or more wireless devices, signalling indicating a plurality of pre-configured ROs comprises sending the indication in one of a Media Access Control (MAC) Control Element (CE) or Downlink Control Information (DCI) transmission.
106. The method of any of embodiments 101-105 wherein the indication of a plurality of pre-configured ROs includes a flag indicating whether the plurality of candidate ROs includes only the last RO in a RACH slot or all ROs of the plurality of candidate ROs.
107. The method of any of embodiments 101-105 wherein the indication of a plurality of pre-configured ROs includes an integer N≥1 indicating that the plurality of candidate ROs consists of the last N ROs in a RACH slot.
108. The method of any of embodiments 101-105 wherein the indication of a plurality of pre-configured ROs includes a bitmask indicating which pre-configured ROs are candidates for specific PRACH transmissions.
109. The method of any of embodiments 101-108 wherein the selected RA preamble transmitted in a pre-configured RO is associated with a 2-step RA procedure.
110. The method of any of embodiments 101-109 wherein the selected RA preamble transmitted in a pre-configured RO is associated with a prioritized RA procedure.

111. The method of embodiment 110 wherein the prioritized RA procedure is a RA triggered for handover.
112. The method of embodiment 110 wherein the prioritized RA procedure is a RA triggered for Beam Failure Recovery (BFR).
114. The method of embodiment 110 wherein the prioritized RA procedure is a RA triggered for a service with a priority level exceeding a predetermined threshold.
115. The method of embodiment 110 wherein the prioritized RA procedure is a RA triggered for a Buffer Status Report (BSR) reporting a volume of data in excess of a predetermined threshold.
116. The method of embodiment 110 wherein the prioritized RA procedure is a RA triggered for services or uplink data having a latency requirement in excess of a predetermined threshold.
117. The method of embodiment 110 wherein the prioritized RA procedure is a RA triggered for handover.
118. The method of embodiment 110 wherein the prioritized RA procedure is a RA triggered for initial system access associated with a high priority level access category or access class.
119. The method of embodiment 110 wherein the prioritized RA procedure is a RA triggered by a Physical Downlink Control Channel (PDCCH) order, and wherein the signalling indicating a plurality of pre-configured ROs the wireless device may use consists of a PRACH Mask Index field of a DCI ordering the RA.
120. The method of embodiment 101 wherein the signalling indicating a plurality of pre-configured ROs includes or references a new or modified PRACH configuration table that includes short PRACH formats spanning only one PRACH occasion at the end of or within a PRACH slot.
121. The method of embodiment 120 wherein the PRACH configuration or RO is allocated for a 2-step RA, and the associated msgA PUSCH resources can be configured to follow the PRACH occasion within the PRACH slot within 25 μs or less.
122. The method of embodiment 121 wherein the associated msgA PUSCH resources can be configured to follow the PRACH occasion within the PRACH slot within 16 μs or less.
123. The method of embodiment 120 wherein the PRACH configuration table includes a column specifying which subset of ROs is used for 2-step RA.
124. The method of embodiment 101 wherein the plurality of pre-configured ROs comprises separately configured 2-step ROs for use in 2-step RA and 4-step ROs for use in 4-step RA.
125. The method of embodiment 124, wherein, for each collision between 2-step ROs and 4-step ROs:
if the colliding 2-step RO is the last 2-step RO in a PRACH slot, the wireless device invalidates colliding 4-step ROs and uses the 2-step RO for 2-step RA; and
if the colliding 2-step RO is other than the last 2-step RO in a PRACH slot, the wireless device invalidates the 2-step ROs and uses the 4-step RO for 4-step RA.
126. The method of embodiment 124, wherein, for each collision between 2-step ROs and 4-step ROs:
if the colliding 2-step RO is configured with a gap until the first symbol of an associated PUSCH transmission of less than 25 usec, the wireless device invalidates colliding 4-step ROs and uses the 2-step RO for 2-step RA; and
otherwise, the wireless device invalidates the 2-step ROs and using the 4-step RO for 4-step RA.
127. The method of embodiment 126, wherein the wireless device invalidates colliding 4-step ROs if the colliding 2-step RO is configured with a gap until the first symbol of an associated PUSCH transmission of less than 16 usec.
128. The method of embodiment 126, wherein:
if a 4-step RO collides with a 2-step msgA PUSCH resource allocation that is allocated with a gap from its associated preceding 2-step RO of less than 25 usec, the wireless device invalidates colliding 4-step ROs and uses the 2-step RO for 2-step RA; and
otherwise, the wireless device invalidates the colliding msgA PUSCH resource allocation and uses the 4-step RO for 4-step RA.
129. The method of embodiment 128, wherein the wireless device invalidates the colliding 4-step RO if the gap from the 2-step msgA PUSCH resource allocation to its associated preceding 2-step RO is less than 16 usec.
130. The method of embodiment 101, wherein the plurality of pre-configured ROs comprises shared or separately configured 2-step ROs for use in 2-step RA and 4-step ROs for use in 4-step RA, wherein:
the wireless device selects only the last 2-step RO in a PRACH slot for 2-step RA.
131. The method of embodiment 130 wherein the wireless device selects only the last 2-step RO in a PRACH slot for 2-step RA by selecting only the last 2-step RO in a PRACH slot only if the wireless device is operating in unlicensed spectrum.
132. The method of embodiment 101 wherein the signalling indicating a plurality of pre-configured ROs comprises a PRACH mask indicating which RO of a PRACH configuration can be used.
133. The method of embodiment 132 wherein the a PRACH mask index indicates that only the last RO in a PRACH slot can be used.
134. The method of embodiment 132 wherein the a PRACH mask index indicates that only the last k ROs in a PRACH slot can be used, where K is an integer 1.
135. The method of embodiment 132 wherein the a PRACH mask index indicates that all ROs other than the RO in a PRACH slot can be used.
136. The method of embodiment 132 wherein the a PRACH mask index indicates that all ROs other than the RO in a PRACH slot can be used.
135. The method of embodiment 132 wherein the PRACH mask identifies, as ROs that can be used for 2-step RA, only the ROs having an associated PUSCH resource allocation that immediately follows the RO.
136. The method of embodiment 135 wherein the PRACH mask identifies, as ROs that can be used for 2-step RA, only the ROs having an associated PUSCH resource allocation that follows the RO with a gap of 25 usec or less.
137. The method of embodiment 101 further comprising:
receiving, from the wireless device, in a gap between the RA preamble transmission and the PUSCH transmission, a cyclic extension so as to reduce the gap to 25 usec or less.
138. The method of embodiment 137 wherein the cyclic extension is an extended cyclic prefix of a msgA PUSCH transmission of a 2-step RA.

139. The method of embodiment 137 wherein the PRACH transmission and the PUSCH transmission both start in the same slot.
140. The method of embodiment 101 wherein the resource allocations of the PRACH transmission and PUSCH transmission are within 25 usec in the time domain.
141. The method of embodiment 140 wherein the resource allocations of the PRACH transmission and PUSCH transmission are within 16 usec in the time domain.
142. The method of embodiment 140 wherein the PUSCH transmission conforms to a TypeB PUSCH mapping and occurs in a subset of symbols of the PRACH slot that occurs after the end of the associated PRACH transmission.
143. The method of embodiment 140 wherein the PUSCH transmission occupies at least part of the PRACH slot of associated PRACH transmission and at least part of the following slot.
144. The method of embodiment 143 wherein the wireless device:
    divides the coded bitstream of the PUSCH transmission into first and second parts;
    modulates and maps the first part to the first slot; and
    modulates and maps the second part to the second slot.
145. The method of embodiment 143 wherein the wireless device:
    divides the Transport Block (TB) of the PUSCH transmission into first and second parts;
    codes and modulates the first part;
    codes and modulates the second part; and
    maps the coded and modulated first and second parts to the two slots, respectively.
146. The method of embodiment 143 wherein the wireless device repeats the Transport Block (TB) of the PUSCH transmission across the two slots.
147. The method of embodiment 101 wherein the PUSCH resource is cell-specifically reserved.
148. The method of embodiment 101 wherein the PUSCH resource is dynamically scheduled.
149. The method of embodiment 101, wherein the wireless device uses an earlier RO for 4-step RA, wherein the wireless device selects an RO not in the plurality of pre-configured ROs signalled by the network, and further comprising:
    receiving, from the wireless device, a different RA preamble in the selected RO;
    transmitting, to the wireless device, signalling identifying a single instance of resources in which to transmit the PUSCH; and
    receiving, from the wireless device, the PUSCH to the network on the identified single instance of resources.
150. The method of embodiment 101, wherein the one or more 4-step ROs are invalidated by one or more 2-step ROs, wherein:
    the plurality of pre-configured ROs is identified by a first configuration signalled to the wireless device; and
    the subset of RA resources comprises one or more ROs wherein the UE may only transmit a RA preamble associated with the PUSCH.
151. The method of embodiment 101, wherein the wireless device uses only the last RO and that is adjacent to PUSCH, wherein the subset of RA resources is comprised in exactly one RO of the plurality of pre-configured ROs.
152. The method of embodiment 101, wherein the ROs and POs are within a slot, wherein the plurality of ROs and the PUSCH together are contained within a slot and having a same subcarrier spacing, where the slot is comprised of a number of OFDM symbols that does not vary with the subcarrier spacing for a given cyclic prefix length.
BB. The method of any of the previous embodiments, further comprising:
    obtaining user data; and
    forwarding the user data to a host computer or a wireless device.

Group C Embodiments

C1. A wireless device configured to perform any of the steps of any of the Group A embodiments.
C2. A wireless device comprising:
    processing circuitry configured to perform any of the steps of any of the Group A embodiments; and
    power supply circuitry configured to supply power to the wireless device.
C3. A wireless device comprising:
    processing circuitry and memory, the memory containing instructions executable by the processing circuitry whereby the wireless device is configured to perform any of the steps of any of the Group A embodiments.
C4. A user equipment (UE) comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
C5. A computer program comprising instructions which, when executed by at least one processor of a wireless device, causes the wireless device to carry out the steps of any of the Group A embodiments.
C6. A carrier containing the computer program of embodiment C5, wherein the carrier is one of an electronic signal, optical signal, radio signal, or computer readable storage medium.
C7. A base station configured to perform any of the steps of any of the Group B embodiments.
C8. A base station comprising:
    processing circuitry configured to perform any of the steps of any of the Group B embodiments;
    power supply circuitry configured to supply power to the wireless device.
C9. A base station comprising:
    processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method, performed by a wireless device operative in a wireless communication network, of performing a Random Access (RA) procedure, the method comprising:
receiving signaling indicating a plurality of pre-configured Random Access Channel (RACH) occasions (RO) which are candidates for specific Physical Random Access Channel (PRACH) transmissions of a 2-step procedure, wherein the signaling comprises a PRACH mask indicating index values with which to index a predefined table to ascertain which ROs are shared between the 2-step RA procedure and a 4-step RA procedure; and
transmitting, to the network, an RA preamble in one of the plurality of pre-configured ROs.

2. The method of claim 1, wherein the method comprises:
receiving signaling indicating a plurality of Physical Uplink Shared Channel (PUSCH) occasions (PO), each comprising a plurality of periodically recurring symbols in which a PUSCH transmission may occur;
receiving signaling indicating a subset of RA resources, each comprising one of the pre-configured RO immediately followed by a first symbol of one of the PO; and
transmitting to the network a PUSCH transmission in a PO associated with the transmitted RA preamble.

3. The method of claim 1, wherein the received indication of a plurality of pre-configured ROs comprises:
a flag indicating whether the plurality of candidate ROs includes only the last RO in a RACH slot or all ROs of the plurality of candidate Ros;
an integer N≥1 indicating that the plurality of candidate ROs consists of the last N ROs in a RACH slot; or
an indication of a bitmask indicating which pre-configured ROs are candidates for specific PRACH transmissions.

4. The method of claim 1, wherein the signaling indicating a plurality of pre-configured ROs includes or references a new or modified PRACH configuration table that includes short PRACH formats spanning only one PRACH occasion at the end of or within a PRACH slot.

5. The method of claim 4, wherein the PRACH configuration or RO is allocated for a 2-step RA, and the associated msgA PUSCH resources can be configured to follow the PRACH occasion within the PRACH slot within a predetermined duration.

6. The method of claim 1, wherein the plurality of pre-configured ROs comprises separately configured 2-step ROs for use in 2-step RA and 4-step ROs for use in 4-step RA.

7. The method of claim 6, further comprising, for each collision between 2-step ROs and 4-step ROs:
if the colliding 2-step RO is the last 2-step RO in a PRACH slot, invalidating colliding 4-step ROs and using the 2-step RO for 2-step RA; and
if the colliding 2-step RO is other than the last 2-step RO in a PRACH slot, invalidating the 2-step ROs and using the 4-step RO for 4-step RA.

8. The method of claim 7, further comprising, for each collision between 2-step ROs and 4-step ROs:
if the colliding 2-step RO is configured with a gap until the first symbol of an associated PUSCH transmission of less than a predetermined duration, invalidating colliding 4-step ROs and using the 2-step RO for 2-step RA; and
otherwise, invalidating the 2-step ROs and using the 4-step RO for 4-step RA.

9. The method of claim 7, further comprising:
if a 4-step RO collides with a 2-step msgA PUSCH resource allocation that is allocated with a gap from its associated preceding 2-step RO of less than a predetermined duration, invalidating colliding 4-step ROs and using the 2-step RO for 2-step RA; and
otherwise, invalidating the colliding msgA PUSCH resource allocation and using the 4-step RO for 4-step RA.

10. The method of claim 1:
wherein the plurality of pre-configured ROs comprises shared or separately configured 2-step ROs for use in 2-step RA and 4-step ROs for use in 4-step RA; and
wherein the signaling indicates only the last 2-step RO in a PRACH slot for 2-step RA.

11. The method of claim 10, wherein selecting only the last 2-step RO in a PRACH slot for 2-step RA comprises selecting only the last 2-step RO in a PRACH slot only if the wireless device is operating in unlicensed spectrum.

12. The method of claim 1:
wherein the signaling indicating a plurality of pre-configured ROs comprises a PRACH mask indicating which RO of a PRACH configuration can be used;
wherein the PRACH mask index indicates:
that only the last RO in a PRACH slot can be used;
that only the last k ROs in a PRACH slot can be used, where K is an integer $\geq 1$;
that all ROs other than the RO in a PRACH slot can be used;
that only the ROs having an associated PUSCH resource allocation that immediately follows the RO can be used for 2-step RA; or
that only the ROs having an associated PUSCH resource allocation that immediately follows the RO with a gap of 25 usec or less can be used for 2-step RA.

13. The method of claim 2:
wherein the plurality of pre-configured ROs comprises separately configured 2-step ROs for use in 2-step RA and 4-step ROs for use in 4-step RA;
wherein one or more 4-step ROs are invalidated by one or more 2-step ROs;
wherein the plurality of pre-configured ROs is identified by a first configuration signaled to the wireless device; and
wherein the subset of RA resources comprises one or more ROs wherein the wireless device may only transmit a RA preamble associated with the PUSCH.

14. A wireless device operative in a wireless communication network, comprising:
communication circuitry configured to wirelessly communicate with one or more nodes of the wireless communication network; and
processing circuitry operatively connected to the communication circuitry, the processing circuitry configured to cause the wireless device to:
receive signaling indicating a plurality of pre-configured Random Access (RA) Channel (RACH) occasions (RO) which are candidates for specific Physical Random Access Channel (PRACH) transmissions of a 2-step procedure, wherein the signaling comprises a PRACH mask indicating index values with which to index a predefined table to ascertain which ROs are shared between the 2-step RA procedure and a 4-step RA procedure; and
transmit to the network an RA preamble in one of the plurality of pre-configured ROs.

15. A method, performed by a base station operative in a wireless communication network, of participating in a Random Access (RA) procedure, the method comprising:
sending, to one or more wireless devices, signaling indicating a plurality of pre-configured Random Access Channel (RACH) occasions (RO) which are candidates for specific Physical Random Access Channel (PRACH) transmissions of a 2-step procedure of a 2-step or prioritized RA procedure, wherein the signaling comprises a PRACH mask indicating index values with which to index a predefined table to ascertain which ROs are shared between the 2-step RA procedure and a 4-step RA procedure; and
receiving, from a wireless device, an RA preamble in one of the plurality of pre-configured ROs.

16. The method of claim 15, wherein the candidate for specific PRACH transmission is only the last RO in a slot.

17. The method of claim 15, wherein the method comprises:
sending, to the wireless device, signaling indicating a plurality of Physical Uplink Shared Channel (PUSCH) occasions (PO), each comprising a plurality of periodically recurring symbols in which a PUSCH transmission may occur;
sending, to the wireless device, signaling indicating a subset of RA resources, each comprising one of the pre-configured RO immediately followed by a first symbol of one of the PO; and
receiving, from the wireless device, a PUSCH transmission in a PO associated with the received RA preamble.

18. The method of claim 15, wherein the indication of a plurality of pre-configured ROs comprises:
a flag indicating whether the plurality of candidate ROs includes only the last RO in a RACH slot or all ROs of the plurality of candidate ROs;
an integer $N \geq 1$ indicating that the plurality of candidate ROs consists of the last N ROs in a RACH slot; or
an indication of a bitmask indicating which pre-configured ROs are candidates for specific PRACH transmissions.

* * * * *